(12) United States Patent
O'Shea et al.

(10) Patent No.: US 11,334,807 B1
(45) Date of Patent: May 17, 2022

(54) LEARNING APPROXIMATE ESTIMATION NETWORKS FOR COMMUNICATION CHANNEL STATE INFORMATION

(71) Applicant: Virginia Tech Intellectual Properties, Inc., Blacksburg, VA (US)

(72) Inventors: Timothy James O'Shea, Arlington, VA (US); Kiran Karra, Arlington, VA (US); T. Charles Clancy, Arlington, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 997 days.

(21) Appl. No.: 16/017,904

(22) Filed: Jun. 25, 2018

Related U.S. Application Data

(60) Provisional application No. 62/523,861, filed on Jun. 23, 2017.

(51) Int. Cl.
| | |
|---|---|
| *G06N 5/04* | (2006.01) |
| *G06N 3/02* | (2006.01) |
| *H04B 17/309* | (2015.01) |
| *H04B 17/391* | (2015.01) |
| *G06N 20/00* | (2019.01) |

(52) U.S. Cl.
CPC ............ *G06N 5/046* (2013.01); *G06N 3/02* (2013.01); *G06N 20/00* (2019.01); *H04B 17/309* (2015.01); *H04B 17/3912* (2015.01)

(58) Field of Classification Search
CPC .......... G06N 5/046; G06N 3/02; G06N 20/00; H04B 17/309; H04B 17/3912
See application file for complete search history.

(56) References Cited

U.S. PATENT DOCUMENTS

2003/0146871 A1\* 8/2003 Karr .................. G01S 5/02
342/457

OTHER PUBLICATIONS

D. F. Specht, "A general regression neural network," IEEE transactions on neural networks, vol. 2, No. 6, pp. 568-576, 1991.
(Continued)

*Primary Examiner* — Manuel A Rivera Vargas
(74) *Attorney, Agent, or Firm* — Fish & Richardson P.C.

(57) ABSTRACT

Methods, systems, and apparatus, including computer programs encoded on computer storage media, for training and deploying machine-learning estimation networks in a communications system. One of the methods includes: processing first information with ground truth information to generate a first RF signal by altering the first information by channel impairment having at least one channel effect, using a receiver to process the first RF signal to generate second information, training a machine-learning estimation network based on a network architecture, the second information, and the ground truth information, receiving by the receiver a second RF signal transmitted through a communication channel including the at least one channel effect, inferring by the trained estimation network the receiver to estimate an offset of the second RF signal caused by the at least one channel effect, and correcting the offset of the RF signal with the estimated offset to obtain a recovered RF signal.

20 Claims, 15 Drawing Sheets

(56) References Cited

OTHER PUBLICATIONS

A Cochocki and R. Unbehauen, Neural networks for optimization and signal processing. John Wiley & Sons, Inc., 1993.
Y. Wang, K. Shi, and E. Serpedin, "Non-data-aided feedforward carrier frequency offset estimators for qam constellations: A nonlinear least-squares approach," EURASIP Journal on Advances in Signal Processing, vol. 2004, No. 13, p. 856 139, 2004.
O. Catoni et al., "Challenging the empirical mean and empirical variance: A deviation study," in Annales de l'Institut Henri Poincar'e, Probabilit'es et Statistiques, Institut Henri Poincar'e, vol. 48, 2012, pp. 1148-1185.
D. Kingma and J. Ba, "Adam: A method for stochastic optimization," arXiv preprint arXiv: 1412.6980, 2014.
F. Chollet, Keras: The Python Deep Learning Library, y 2015.
M. Abadi, A. Agarwal, P. Barham, E. Brevdo, Z. Chen, C. Citro, G. S. Corrado, A. Davis, J. Dean, M. Devin, et al., "Tensorflow: Large-scale machine learning on heterogeneous distributed systems," arXiv preprint arXiv: 1603.04467, 2016.
T. J. O'Shea and J. Hoydis, "An introduction to machine learning communications systems," CoRR, vol. abs/1702.00832, 2017. [Online]. Available: http://arxiv.org/abs/1702.00832.

\* cited by examiner

LEARNING APPROXIMATE ESTIMATION NETWORKS FOR COMMUNICATION CHANNEL STATE INFORMATION

CROSS-REFERENCE TO RELATED APPLICATION

This application claims priority to U.S. Provisional Application No. 62/523,861 filed on Jun. 23, 2017. The disclosure of this prior application is considered part of and is incorporated by reference in the disclosure of this application.

TECHNICAL FIELD

The present disclosure relates to machine learning and deployment of estimations in adaptive wireless communications or signal processing systems, and in particular for radio frequency (RF) signals.

BACKGROUND

Estimation is an important component of synchronization in some wireless and signal processing systems. Various techniques for estimator derivation, optimization, and statistical characterization from analytic system models are used today.

SUMMARY

In general, the subject matter described in this disclosure can be embodied in methods, apparatuses, and systems for training, deploying, and improving estimation for communication channel state information by using at least one machine-learning estimation network in radio communications or signal processing systems.

In one aspect, a method is performed by at least one processor to train at least one machine-learning network. The method includes: processing first information with ground truth information to generate a radio frequency (RF) signal; using a receiver to process the RF signal to generate second information; and training the machine-learning estimation network based on a network architecture, the second information as an estimator input, and one or more items of the ground truth information as one or more estimator target outputs to generate learned estimation information.

Particular implementations of the above aspect may include one or more of the following features. For example, processing the first information can include altering the first information by a channel impairment having at least one channel effect.

In some examples, the channel impairment includes real channel impairment. Altering the first information can include transmitting data associated with the first information over a communication channel, and at least one portion of the ground truth information can be obtained based on a measurement of the communication channel. In some examples, the channel impairment includes simulated channel impairment using at least one channel model.

The at least one channel effect can include at least one portion of the ground truth information including channel state information. The channel state information can include at least one of a frequency offset, a timing offset, a phase offset, a noise value, a rate offset, a multiple-input and multiple-output (MIMO) equalization offset, an interpolated pilot response offset, an impulse response modification, a fading effect, or a hardware distortion.

In some implementations, processing the first information includes modulating the first information with at least one modulation parameter, and the at least one modulation parameter can be conveyed out as at least one portion of the ground truth information to the machine-learning estimation network.

In some implementations, processing the first information includes using an encoder to encode the first information with at least one encoding parameter. The at least one encoding parameter can be conveyed out as at least one portion of the ground truth information to the machine-learning estimation network. In some examples, the method further includes performing correction for estimated offset or effect based on the second information and the learned estimation information. In some examples, a decoder is used to process the correction for the estimated offset or effect to determine an update for the learned estimation information based on ground truth information of the first information.

In some implementations, the encoder implements an encoding mapping that is based on results of training an encoder machine-learning network and the decoder implements a decoding mapping that is based on results of training a decoder machine-learning network, and the encoder machine-learning network and the decoder machine-learning network have been jointly trained as an auto-encoder to learn the learned estimation information together with the machine-learning estimation network. At least one of the encoder machine-learning network or the decoder machine-learning network can include at least one of a deep dense neural network (DNN) or a convolutional neural network (CNN) including a series of parametric multiplications, additions, and non-linearities.

In some examples, the method further includes: determining, by a decoder, a reconstruction loss based on the first information and the second information; determining, by the trained machine-learning estimation network, an estimation error loss based on one or more outputs of the trained machine-learning estimation network and the one or more estimator target outputs; and determining an update for at least one of the machine-learning estimation network, the encoder, or the decoder.

The network architecture for the machine-learning estimation network can be different for a different channel effect. The machine-learning estimation network can include a neural network including an artificial neural network (ANN), a DNN, a CNN, a recurrent neural network (RNN), or a residual network (ResNet). The network architecture can include definitions of at least one of network connections and hyper-parameters of the machine-learning estimation network.

In some implementations, training the machine-learning estimation network includes: performing optimization in the machine-learning estimation network to leverage the estimator input and the estimator target outputs to obtain an optimized set of model parameters as the learned estimation information. The optimized set of model parameters can include at least one of weights, biases, or hyper-parameters that allow the machine-learning estimation network to approximate outputs which closely match the estimator target outputs when given the estimator input. The optimization can include stochastic gradient descent (SGD), modified SGD with momentum, Adam, RMSProp, or AdaGrad.

The method can further include minimizing a loss function including a mean-squared error (MSE) loss function, a mean absolute error (MAE) loss function, an f-divergence loss function, a cross-entropy loss function, a log-cosine hyperbolic loss function, or a Huber loss function.

In another aspect, a method is performed by at least one processor to deploy one or more machine-learning estimation network to a communications system. The method includes: receiving, by at least one receiver, a RF signal transmitted through a communication channel having at least one channel effect; inferring, by a previously-trained machine-learning estimation network, the receiver to estimate an offset of the RF signal caused by the at least one channel effect, the machine-learning estimation network being trained based on the at least one channel effect; and correcting the offset of the RF signal with the estimated offset to obtain a recovered RF signal.

Particular implementations of the above aspect may include one or more of the following features. For example, the method can include deploying a plurality of trained machine-learning estimation networks in succession or parallel in the communications system to estimate or correct respective offsets corresponding to a plurality of parameters of the RF signal.

The trained machine-learning estimation network can include a trained timing estimation model, a trained frequency estimation model, a trained fading estimation model, a trained reflection estimation model, or a trained estimation model for equalization and symbol detection.

The method can further include: updating at least one of an encoder or a decoder in the communications system based on feedback information generated by the previously-trained machine-learning estimation network, the feedback information being associated with the estimated offset. In some examples, updating at least one of the encoder or the decoder based on the feedback information further includes: determining a channel mode, from among a plurality of channel modes, that represents a state of the communication channel based on the feedback information; and updating at least one of the encoder or the decoder based on the channel mode of the communication channel.

The communication channel includes a non-Gaussian channel. The trained machine-learning estimation network can be used to correct the offset of the RF signal with the estimated offset. The at least one channel effect can include channel state information of the communication channel, and the estimated offset can include an estimate of the channel state information. The estimate of the channel state information can include at least one or more estimates of frequency offset, timing offset, phase offset, noise values, rate offset information, impulse response, multiple-input and multiple-output (MIMO) equalization, interpolated pilot response estimation, fading effects, symbol estimation, spatial characterization, interference characterization, or hardware distortion.

In a further aspect, a system includes at least one processor and at least one computer memory coupled to the at least one processor having stored thereon instructions which, when executed by the at least one processor, cause the at least one processor to perform operations including: processing first information with ground truth information to generate a first radio-frequency (RF) signal at least partially by altering the first information by a channel impairment having at least one channel effect; using at least one receiver to process the first RF signal to generate second information; training a machine-learning estimation network based on a network architecture, the second information as an estimator input, and one or more items of the ground truth information as one or more estimator target outputs to generate learned estimation information; receiving, using the at least one receiver, a second RF signal transmitted through a communication channel having the at least one channel effect; inferring, by the trained machine-learning estimation network, the receiver to estimate an offset of the second RF signal caused by the at least one channel effect; and correcting the offset of the RF signal with the estimated offset to obtain a recovered RF signal.

Other implementations of these and other aspects include corresponding systems, apparatuses, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

Figure 1:
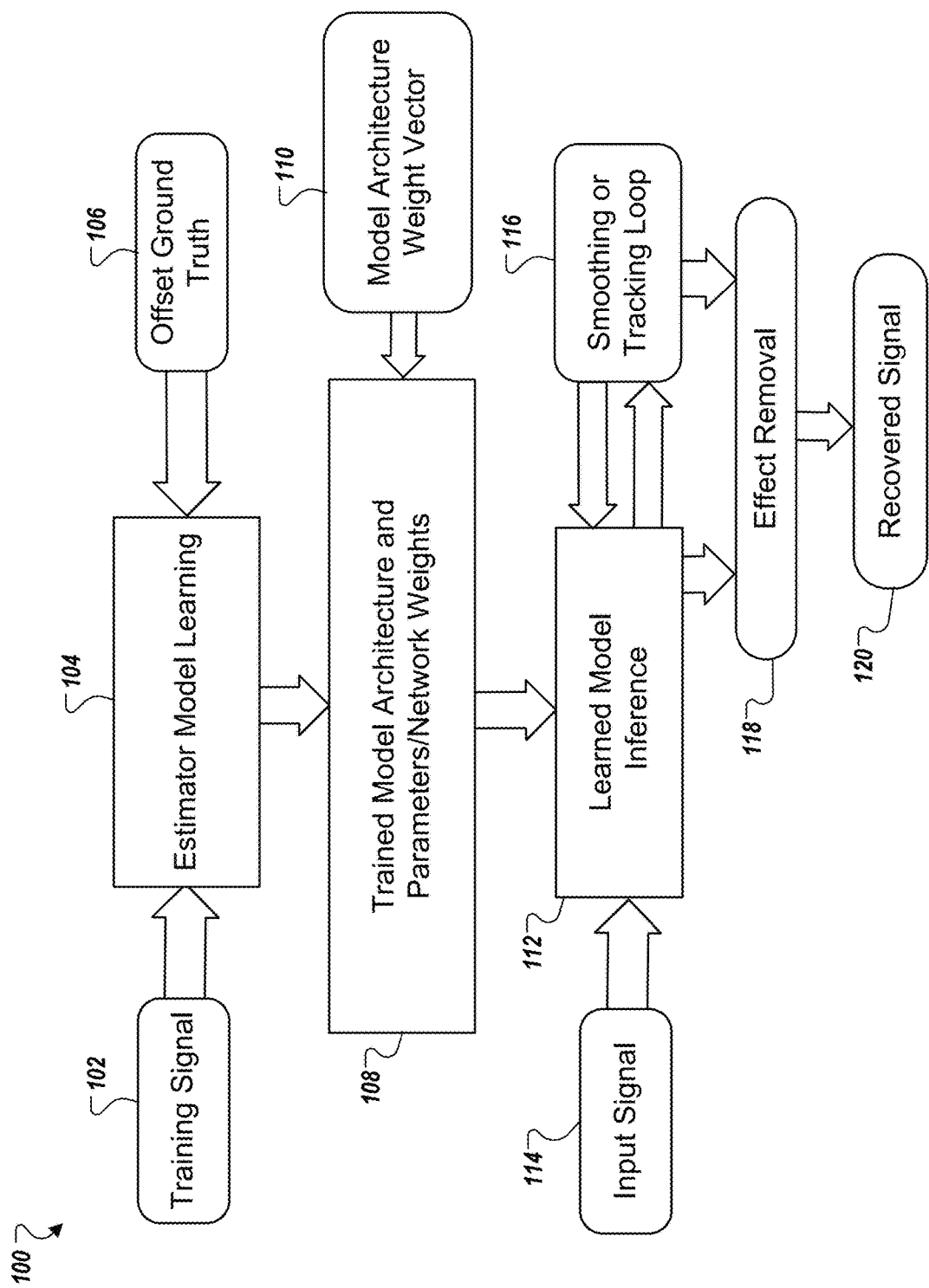
FIG. 1 illustrates an example of a system for training and deploying estimator models in a communications system.

In conventional approaches, simplified analytic system models are used on estimator derivation, manual optimization and statistical characterization. For example, for single carrier phase-shift keying (PSK) modulation, carrier frequency offset (CFO) estimation and timing estimation can be used to recover the time and frequency of a received signal transmission to enable demodulation and information recovery. In some cases, estimators are derived analytically from expressions for the signal model and the channel model (e.g., an assumed additive white Gaussian noise (AWGN) or simplified fading model) using techniques such as maximum-likelihood (MLE) or minimum mean squared error (MMSE) optimization metrics to produce an expression for an estimator. However, the conventional analytical approaches suffer from several shortcomings. First, the approaches rely on an accurate analytic model of the signal and channel, the signal is man-made and typically easy to model, but hardware defects and distortion effects along with channel propagation effects or distributions in specific environments are rarely captured in great detail when performing this optimization. Analytic estimators derived under Gaussian channel assumptions are often used by default, which can often degrade performance when deployed under real world conditions. Second, the approaches require a manual analysis process to derive a well conditioned estimator for a specific signal type, modulation type, and/or set of reference tones which is time consuming and often leads to time and cost in system engineering. Third, algorithms formed through the analytic process are typically kept compact (minimum number of terms) in order to facilitate the ease of analysis. However, from a power consumption perspective, such a compact form may not be the most concurrent form of an estimator, where algorithmic concurrency often leads to the lowest power algorithm on mobile platforms.

Implementations of the present disclosure provide novel techniques for building estimators that rely principally on approximate regression using large datasets and large computationally efficient artificial neural network models capable of learning non-linear function mappings that provide compact and accurate estimates. The techniques can address the above shortcomings of the analytical approach. For example, the learned estimators can provide improvements in areas such as short-time estimation and estimation under non-trivial real world channel conditions such as fading or other non-linear hardware or propagation effects. The techniques can reduce the computational complexity, size, weight, and power.

In some implementations, at least one machine-learning estimation network is trained to estimate channel state information of communications channels. The training can be designed to achieve various criteria, such a low bit error rate, low power, low bandwidth, low complexity, performing well in particular regimes such as at a low signal to noise (SNR) ratio or under specific types of fading or interference, and/or other criteria. The results of training such machine-learning estimation networks may then be utilized to deploy in real-world communications systems such as receiver architectures for recovering signal symbols and transmitted information messages.

In some implementations, the machine-learning estimation networks can be optimized jointly with an autoencoder system including encoders and decoders in communication scenarios, which can not only learn an estimator but also adapt the actual encoding methods to improve the capability to estimate for the encoders. For example, a modulation can be learned to better perform carrier frequency offset (CFO) estimation and minimize bit error rate at the same time. In some implementations, learning and adaptation of the encoder and decoder may be implemented during deployment, based on feedback information, e.g., provided by the trained machine-learning estimation networks. These encoders and decoders may replace or augment one or more signal processing functions such as modulation, demodulation, mapping, error correction, or other components which exist in those systems today.

The disclosed implementations present a novel approach to build estimators designed and deployed for radio communications and/or signal processing applications. For example, the disclosed implementations may help improve a typically slow and incremental process of radio signal processing engineering, and instead enable a new way of designing, constructing, and realizing radio communications systems. By implementing machine-learning estimation networks that may be trained to learn estimation parameters (and optionally suitable encoding and decoding techniques) for different types of communication media, techniques disclosed herein offer various advantages, such as improved power, resiliency, and complexity advantages over presently available systems. This can be especially important for communications channels which have very complex sets of effects which are hard to model, or hard to optimize for using other approaches. The techniques herein can be applied for different offsets (e.g., frequency offsets) on different elements, e.g., in multiple-input and multiple-output (MIMO) equalization processes.

Implementations disclosed herein may be applied to a wide range of radio communication systems, such as cellular, satellite, optical, acoustic, physical, emergency handheld, broadcast, point-to-point, Wi-Fi, Bluetooth, and other forms of radio that need estimations of channel state information, such as estimations for channel impairments (e.g., to aide in synchronization or information recovery). Channel impairments may include, for example, thermal noise, such as Gaussian-like noise, to more complex impairments such as multi-path fading, impulse noise, spurious or continuous jamming, interference, distortion, hardware effects, and other impairments.

During training, a machine-learning estimation network (or together with an encoder machine-learning network and decoder machine-learning network) may be trained to perform unsupervised, or partially supervised, machine learning to determine techniques for estimating channel state information over a communication channel. Accordingly, in some scenarios, rather than being reliant upon pre-designed systems for error correction, modulation, pre-coding, and shaping, the disclosed implementations herein adaptively learn techniques for estimating channel state information and optionally techniques encoding information into waveforms that are transmitted over a channel and techniques for decoding received waveforms into reconstructed information. The machine-learning estimation network, the encoder machine-learning network and/or decoder machine-learning network may be trained on real or simulated channel conditions. Encoders and/or decoders that utilize results of training such machine-learning networks including the machine-learning estimation network may further be updated during deployment, thus providing advantages in adapting to different types of wireless system requirements, in some cases improving the throughput, error rate, complexity, and power consumption performance of such systems. This may occur for example by exploiting specific knowledge about random distributions such as delay spread or Doppler offsets occurring within the geometry of a single cell leading to a better estimation performance. Additionally or alternatively, this may occur by adapting to specific distributions exhibited by specific hardware devices, couplings, reflections or other impairments within a wireless system leading to better estimation performance.

As such, regardless of the type of RF channel, RF channel modulation, or RF channel impairment, implementations disclosed herein can provide broadly applicable techniques for learning representations of information that enable reliable estimation and communication over impaired RF channels. Depending on the configuration of the training system and data sets and channel models used, such machine-learning communication techniques can specialize in performance for a narrow class of conditions, signal or channel types, or may generalize and optimize performance for a wide range of signal or channel types or mixtures of one or more signals or channels.

FIG. 1 illustrates an example of a system 100 for training and deploying machine-learning estimation networks (or estimator models) in a communications system. One or more estimator models can be first trained to learn channel state information, e.g., values/offsets, associated with one or more communication channels in the communications system. Then the trained estimator models are deployed in the communications system to estimate and correct offsets of an actual input signal through the communication channels to obtain a recovered clean signal.

Compared to a traditional approach that produces estimates of the channel state information using analytical error/estimate expressions where the estimates are analytically derived from signal/data/modulation expressions, the system 100 uses a machine-learning estimator model 104 that can have unknown parameter values. The estimator model 104 is trained with training signals 102 and offset ground truth information 106 to determine the estimation parameters including the unknown parameter values. As discussed with further details below, for example with reference to FIGS. 2A-2C, the ground truth information 106 can be associated with the training signals 102, modulation or encoding parameters on the training signals, and/or channel impairments of the communication channels.

Through the estimator model learning and based on model architecture (or network architecture) and weight vector 110 for the estimator model 104, a trained model architecture and a set of parameters/network weights 108 can be obtained. Accordingly, the mapping from input signals to estimates can be obtained. As discussed with further details below, for example with reference to FIGS. 3A-3C, the trained estimator model 108 can be then deployed in the communications system. The trained estimator model 108 can be used for inference 112 from input signals 114 to offset estimates that in some cases can be smoothed or used in a tracking loop 116, e.g., to reduce error or increase estimate stability. The offset estimates can be used to remove channel effects or uncertainty from the input signals 114 via effect removal 118 (e.g., sample timing adjustment, frequency adjustment, impulse response adjustment, or other adjustment) to obtain a recovered clean signal 120.

Example Systems for Training Estimator Models

Figure 2A:
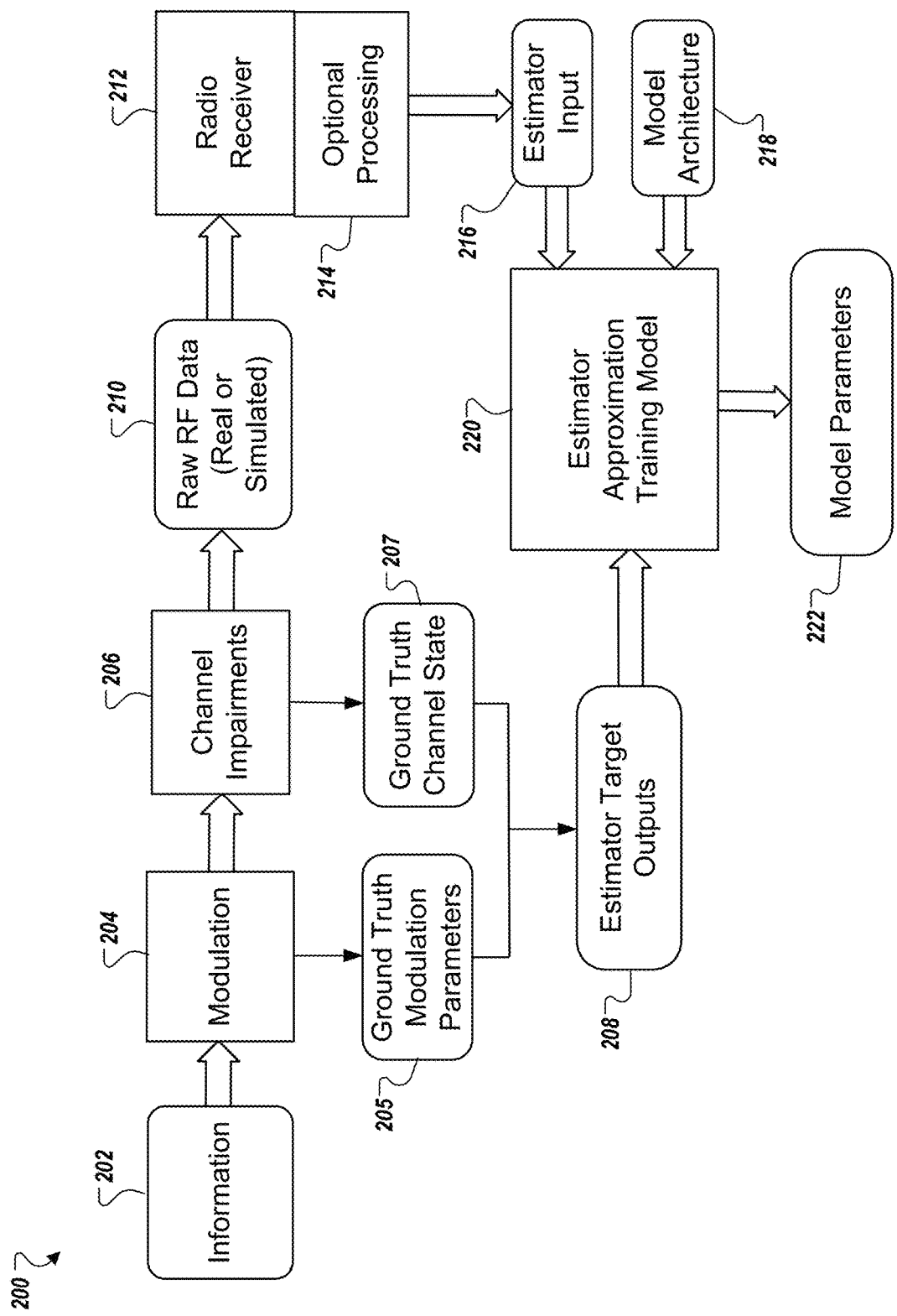
FIG. 2A illustrates an example of a radio frequency (RF) system for training estimator models for radio modulation protocols.

FIG. 2A illustrates an example of a radio frequency (RF) system 200 for training estimator models within a radio communications system for radio communications protocols. The radio communications system can transmit information (signal or message) 202 including bits, packets, voice, data, discrete symbols or similar signals. In scenarios of training, the information 202 includes known training information.

Construction, training, and evaluating an estimator model can be based on a representative dataset. When relying on learned estimators, much of work and difficulty lies in generating a dataset which accurately reflects the final usage conditions desired for the estimator. In some cases, numerous examples of wireless emissions in complex baseband modulated with one or more modulation parameters/methods and sampled with rich channel impairment effects which are designed to match the intended real world conditions the system will operate in can be produced.

Referring to FIG. 2A, the information 202 can undergo a modulation 204 such as a digital quadrature amplitude modulation (QAM), phase-shift keying (PSK), orthogonal frequency-division multiplexing (OFDM), or other modulation method. The modulation 204 can include a number of parameters, e.g., pulse shaping filter roll-off, modulation index, cyclic prefix length, number of subcarriers, and/or insertion of known reference tones, which can be conveyed out-of-band as ground truth modulation parameters 205. The modulated information (e.g., as signal data examples) from the modulation 204 can then undergo channel impairments 206. The channel impairments can be associated with one or more communication channels in the radio communications system and can include at least one channel effect.

In some cases, the channel impairments are real, e.g., the modulated information is transmitted and recorded over real digital to analog converters (DAC) and then back through analog to digital converters. The modulated information can be upconverted to RF frequencies and transmitted over the air.

In some cases, the channel impairments 206 are simulated using channel models, e.g., additive white Gaussian noise (AWGN), oscillator, clock, mobility, fading models such as Rayleigh fading or ray tracing, and/or other models designed to simulate channel effects.

In some examples, different examples can be produced for each information or modulated information, e.g., producing one or more augmented version of each example. Effects in a communication channel can have ground truth channel state information 207, e.g., values of random variates drawn from random variables used within the simulator, which may include frequency offset, phase offset, fading taps, noise values, timing offsets, rate offsets, and/or other stochastic effects occurring within the channel.

In the case of real channel measurement, alternate sources of ground truth such as the use of traditional estimators, external device/dynamics controls or measurements can be used to acquire the ground truth channel state information 207 which otherwise would be unknown. For simulation, these known values may be propagated out of band as the ground truth channel state information 207 which may be used later for training estimator models 220. For example, global positioning system (GPS) tracking data and timing information may be used to track location and timing of an emitter from which Doppler based frequency offset can be derived along with accurate ground truth timing information, as well as reflective paths, given sufficiently detailed knowledge of the environment.

Examples of raw RF data 210 that have real or simulated channel effects applied can be then received by a radio receiver 212 and can optionally undergo a plurality of stages of processing 214 to generate new information which can then be used as estimator input 216 in an estimator training process. The optional processing 214 can include additional estimation and/or correction stages. One or more items of ground truth information from 205, 207 can constitute estimator target outputs 208 for training.

The estimator approximation training model 220 takes in a model architecture 218 and performs an optimization method while leveraging the estimator input 216 and the estimator target outputs 208 to obtain an optimized set of model parameters 222. The model parameters 222 can constitute a set of weights, biases, and other parameters or hyper-parameters which allow the estimator model 220 to approximate outputs which closely match the estimator target outputs when given estimator input data.

The estimator model 220 can be a neural network such as an artificial neural network (ANN), a deep dense neural network (DNN), a convolutional neural network (CNN), a recurrent neural network (RNN), or a residual network (ResNet). The model architecture 218 can include definitions of network connections and/or hyperparameters. As discussed with further details below, the model architecture 218 can include a number of layers with corresponding parameter values that can be unknown.

The optimization method can include stochastic gradient descent (SGD) style optimizers such as Adam, RMSProp, AdaGrad, or other gradient descent optimization algorithms. The large range of model architecture 218 can be searched over using a directed or undirected search technique and using the optimization method to perform gradient descent to optimize for model parameters 222 for each architecture based on the estimator input 216 and target outputs 208 as the training dataset. The optimization and model search can be a trade-off where the search is for a model of a minimal or limited complexity which achieves a satisfactory level of performance. For example, the estimator model 220 can perform the optimization method based on minimizing a loss function. In some cases, the estimator model 220 can choose the best performing model based on the loss function, without limiting or optimizing for model complexity. In some cases, a separate loss function is used for single-architecture parameter training process (e.g., SGD), and for directed model search surrounding the training process (e.g., directed search). This separate (directed search) loss function may include measures of the architecture complexity, e.g., by using execution time, Kolmogorov complexity, or operation counts.

The loss function can include a mean-squared error (MSE) loss function, a mean absolute error (MAE) loss function, a cross-entropy loss function, a log-cosine hyperbolic loss function, an f-divergence, or a Huber loss function. Table I shows analytical expressions of the loss functions. In some cases, the log-cosine hyperbolic loss function and the Huber loss function can improve properties in robust learning, which may benefit a regression learning task on particular datasets and tasks. In some cases, MSE loss function can provide relatively better quantitative performance.

TABLE I

Expressions of Regression Loss Functions

| Method | Expression |
| --- | --- |
| MSE | $L_{MSE}(y, \hat{y}) = \Sigma_i (y_i - \hat{y}_i)^2$ |
| MAE | $L_{MAE}(y, \hat{y}) = \Sigma_i \text{abs}(y_i - \hat{y}_i)$ |
| log-cosh | $L_{LogCosh}(y, \hat{y}) = \Sigma_i \log(\cosh(y_i - \hat{y}_i))$ |
| Huber | $L_{Huber}(y, \hat{y}) = \sum_i \begin{cases} \frac{1}{2}(y_i - \hat{y}_i)^2 & \text{abs}(y_i - \hat{y}_i) < 1 \\ (y_i - \hat{y}_i) & \text{abs}(y_i - \hat{y}_i) \geq 1 \end{cases}$ |

In contrast to analytical approaches, it is possible to optimize the estimator model for both data-aided (e.g., known reference signals present in example datasets), or non-data-aided (e.g., all whitened random information) methods, as well as for complex cascades of linear and non-linear effects within the modulation and channel impairments jointly.

Figure 2B:
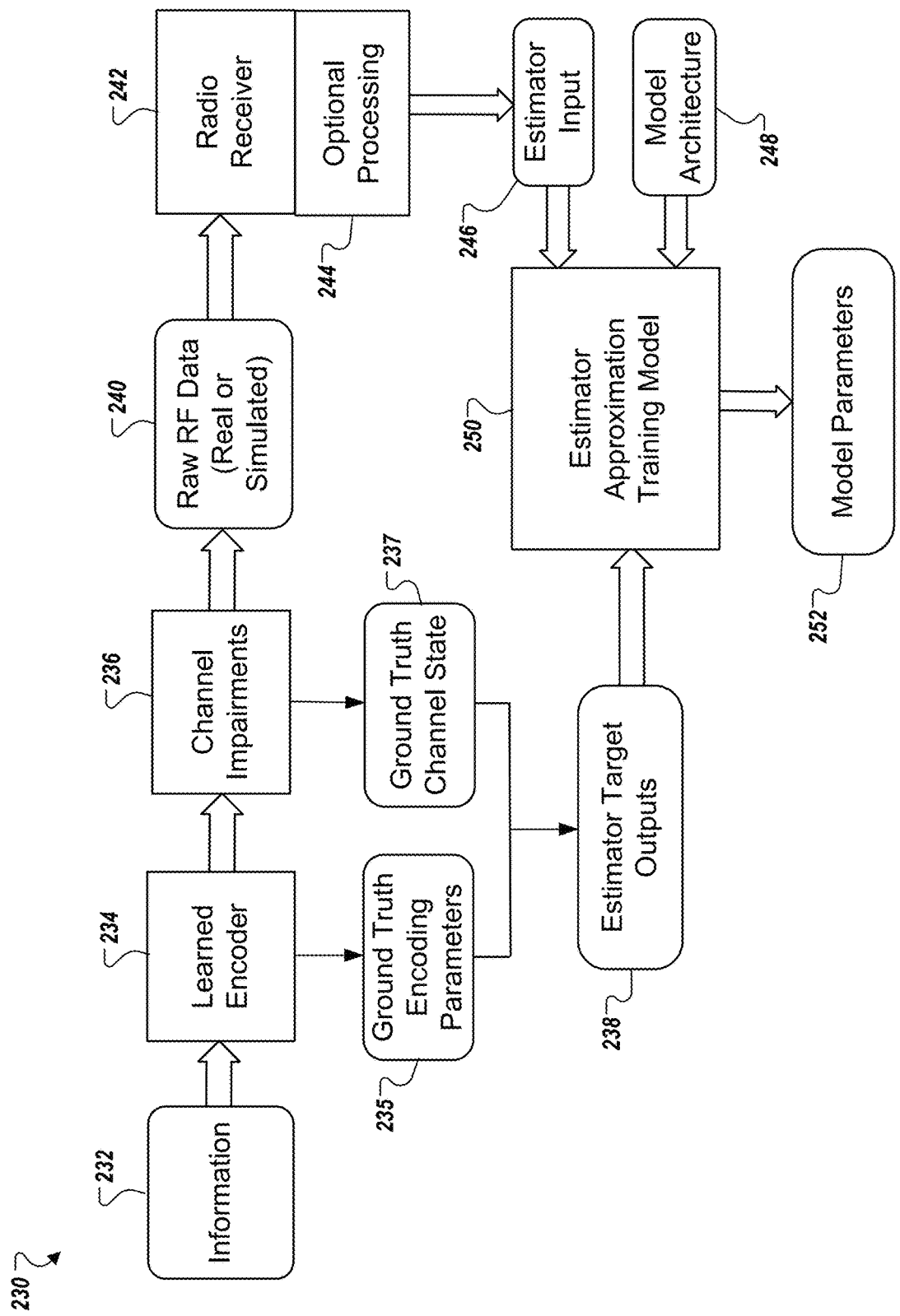
FIG. 2B illustrates an example of a RF system for training estimator models for autoencoder based radio communications systems.

FIG. 2B illustrates an example of a RF system 230 for training estimator models for autoencoder based radio communications systems. Compared to the RF system 200 in FIG. 2A, an autoencoder 234 is used to encode transmitted information 232 instead of using the modulation 204 (e.g., Quadrature Phase Shift Keying, OFDM, QAM, etc.). The encoder 234 can be implemented as an encoding mapping that is based on results of training an encoder machine-learning network. The encoder machine-learning network can include at least one of a deep dense neural network (DNN) or a convolutional neural network (CNN) having a series of parametric multiplications, additions, and non-linearities.

Channel impairments 236 are used to augment channel effects/impairments of the encoded information to obtain raw RF data (real or simulated) 240. The raw RF data 240 is sent to a radio receiver 242 with optional processing 244 to generate new data as estimator input 246. The optional processing 244 can include additional estimation and/or correction stages. Ground truth encoding parameters 235 passed from the learned encoder 234 and ground truth channel state information 237 passed from the channel impairments 236 can form ground truth information. One or more items of the ground truth information can be used as estimator target outputs 238 for estimator model learning. Similar to the estimator model 220, an estimator approximation training model 250 is trained based on a model architecture 248, the estimator input 246, and the estimator target outputs 238 to generate learned model parameters 252.

Figure 2C:
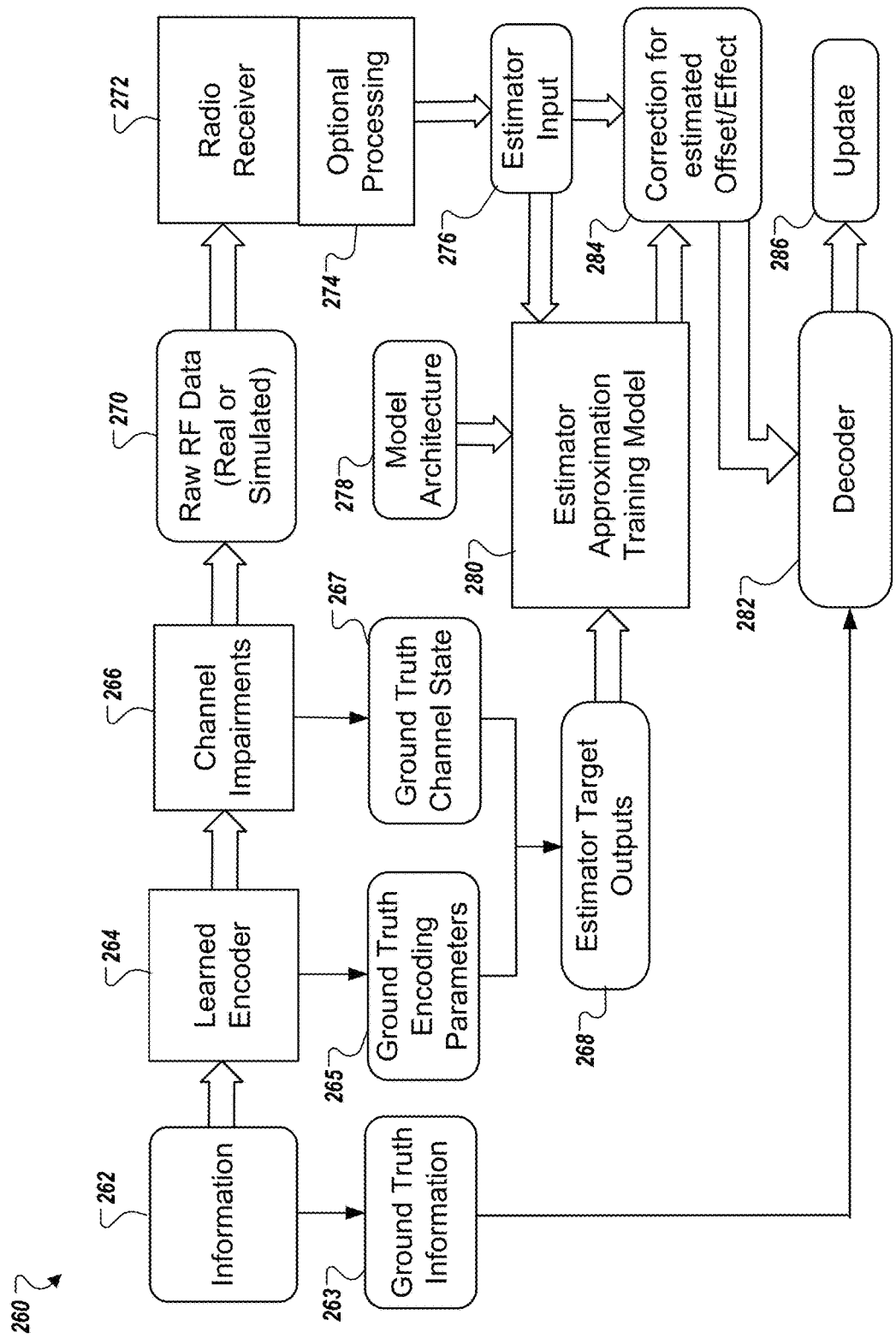
FIG. 2C illustrates an example of a RF system for training estimator models for autoencoder based radio communications systems jointly with an autoencoder system.

FIG. 2C illustrates an example of a RF system 260 for training estimator models for autoencoder based radio communications systems jointly with an autoencoder system. Compared to the RF system 230 of FIG. 2B, the RF system 260 uses the autoencoder system that includes an encoder 264 and a decoder 282. The encoder 264 implements an encoding mapping that is based on results of training an encoder machine-learning network and the decoder 282 implements a decoding mapping that is based on results of training a decoder machine-learning network, and the encoder machine-learning network and the decoder machine-learning network have been jointly trained as an auto-encoder system to learn estimation parameters together with an estimator approximation training model 280. At least one of the encoder machine-learning network or the decoder machine-learning network includes at least one of a DNN or a CNN having a series of parametric multiplications, additions, and non-linearities.

Similar to the RF system 230, the RF system 260 uses the learned encoder 264 to encode information 262 and channel impairments 266 to augment channel effects to obtain RF data 270 (real or simulated). The raw RF data 270 is sent to a radio receiver 272 with optional processing 274 to generate new data as estimator input 276. The optional processing 274 can include additional estimation and/or correction stages. Ground truth encoding parameters 265 passed from the learned encoder 264 and ground truth channel state information 267 passed from the channel impairments 266 form ground truth information, and one or more items of the ground truth information can be used as estimator target outputs 268 for estimator model learning. The estimator approximation training model 280 is trained based on a model architecture 278, the estimator input 276, and the estimator target outputs 278 to generate learned model parameters.

Different from the RF system 230, the RF system 260 performs correction for estimated offset/effect 284 based on the estimator input 276 and the learned model parameters from the estimator model 280. In some cases, the decoder 282 is configured to process the correction for the estimated offset/effect 284 to determine an update 286 for the learned model parameters and/or the encoder and decoder based on ground truth information of the information 262. For example, the decoder 282 can compare the corrected RF signal and the information 262 to determine the update 286. In this case, the estimator 280 may be used to help in synchronization of the new autoencoder based communications system 260, and may jointly optimize the encoding to facilitate accurate synchronization. In other cases, the decoder 282 and the estimator 280 may separately process the information 262, and each produce a loss which may be jointly used for updates. For example, the decoder 282 can produce a reconstruction or error rate loss based on the information 262 and received information by the radio receiver 272, while the estimator 280 can separately produce an estimation error or accuracy loss between estimator outputs and the estimator target outputs 268. In this way, different encodings (either easy or hard to perform estimation) may be learned and may be able to serve as a good or poor time or frequency reference depending on choice of loss function.

By jointly optimizing the three networks (including the estimator model 280, the encoder machine-learning network, and the decoder machine-learning network), the RF system 260 can jointly learn the estimator model 280 along with encoder and decoder weight updates. For example, the RF system 260 can adapt the actual encoding methods to improve the ability to learn the estimator for the encoder and decoder. In a particular example, the RF system 260 can learn a modulation where CFO or equalizer estimation error minimization and bit error rate minimization are performed at the same time. The encoder/decoder updates can be performed using reconstruction loss between reconstructed information from the decoder 282 and information 262, and the encoder/estimator can be optimized based on estimator error loss (e.g., MSE) between the estimator outputs and the estimator target outputs 268. In such a way, new modulations/encodings can be developed to further be highly time or frequency accurate, for example by learning modulations which facilitate the accurate estimation of the offsets directly.

Example Systems for Deploying Trained Estimator Models

Figure 3A:
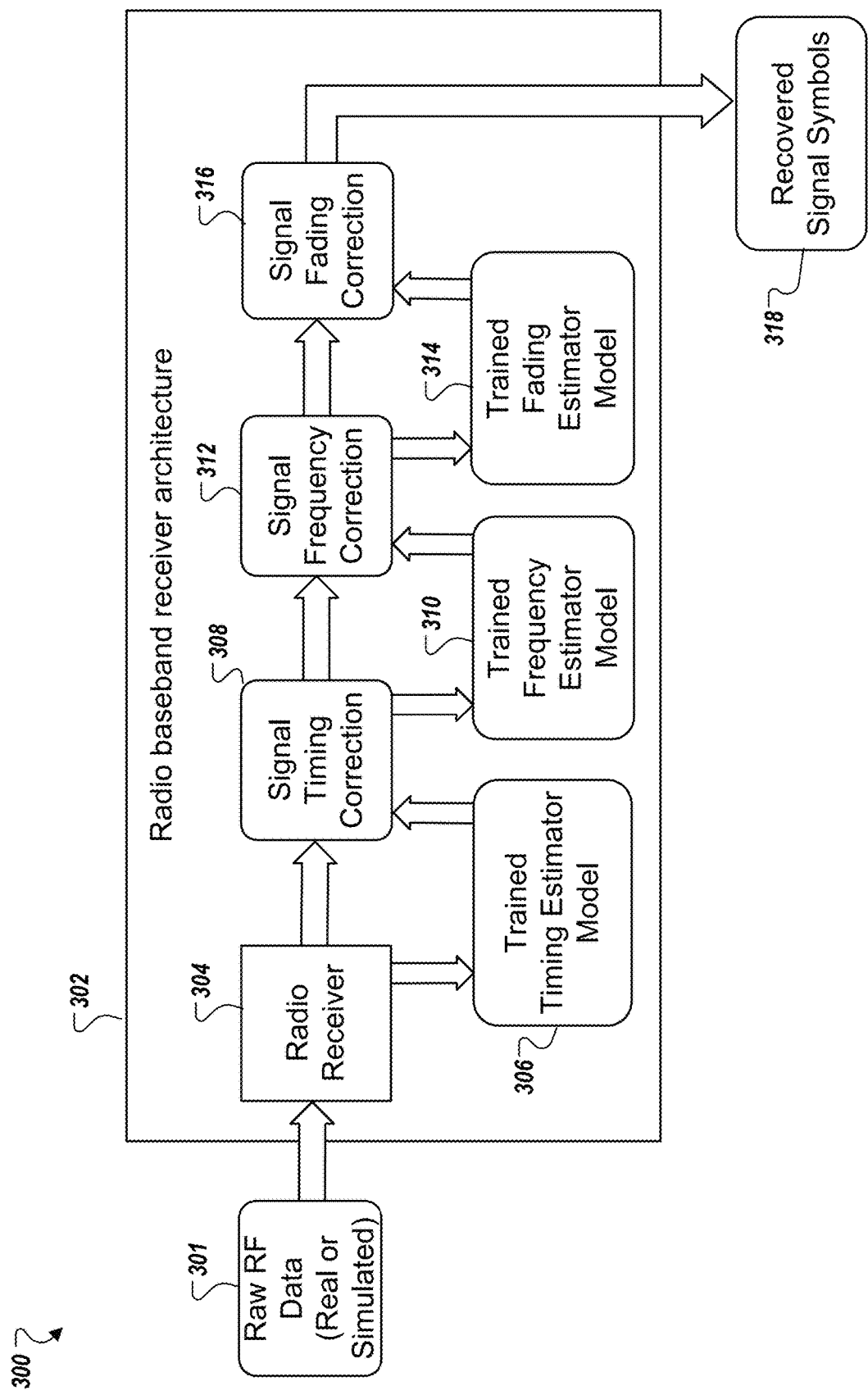
FIG. 3A illustrates an example of deploying one or more learned/trained estimator models into a radio communications system.

FIG. 3A illustrates an example 300 of deploying one or more learned/trained estimator models into a radio communications system. For illustrations only, three different estimator models are used in succession in a radio baseband receiver architecture 302 of the radio communications system to perform inference to help in recovering signal symbols and information transmitted as raw RF data 301 (real or simulated). The estimator models can be also used in parallel in the receiver architecture 302 to obtain their respective estimates for the raw RF data 301. The raw RF data 301 can be obtained from a training signal, e.g., the training signal 102 of FIG. 1 or actual input signal, e.g., the input signal 114 of FIG. 1.

The receiver architecture 302 can include a radio receiver 304, a signal timing correction module 308, a signal frequency correction module 312, and a signal fading correction module 316. Respective estimator models can be trained to estimate different channel effects or channel state information, as illustrated in FIGS. 2A-2C. For example, a trained timing estimator model 306, a trained frequency estimator model 310, and a trained fading estimator model 314 can be obtained for the signal timing correction module 308, the signal frequency correction module 312, and the signal fading correction module 316, respectively.

The trained timing estimator model 306 can estimate timing offset corresponding to symbol detection/timing/clock and the signal timing correction module 308 can correct or remove the estimated timing offset. Similarly, the trained frequency estimator model 310 and the signal frequency correction module 312 can perform carrier frequency offset estimation and correction, and the trained fading estimator model 314 and the signal fading correction module 316 can perform channel fading response estimation and removal (equalization) of the signal. After these effects are removed, a clean recovered signal symbol 318 is obtained, which has been time, frequency, and fading corrected from channel offsets due to the channel effects.

The radio baseband receiver architecture 302 can be applied and inserted into a set of exemplary devices, including cellular baseband processors (e.g., long-term evolution (LTE), 5G, or 6G receiver modems), personal computing devices (e.g., laptops and tablets implementing WLAN (wireless local area network)/Wi-Fi or WMAN (wireless metropolitan area networks) or other packet data wireless radios), handheld devices (e.g., military mesh networks, emergency mobile radios, satellite communications transceivers such as VSAT (very small aperture terminal) ground stations), or point to point radios (e.g., microwave backhaul transceivers), along with any other similar digital radio transceiver system.

Figure 3B:
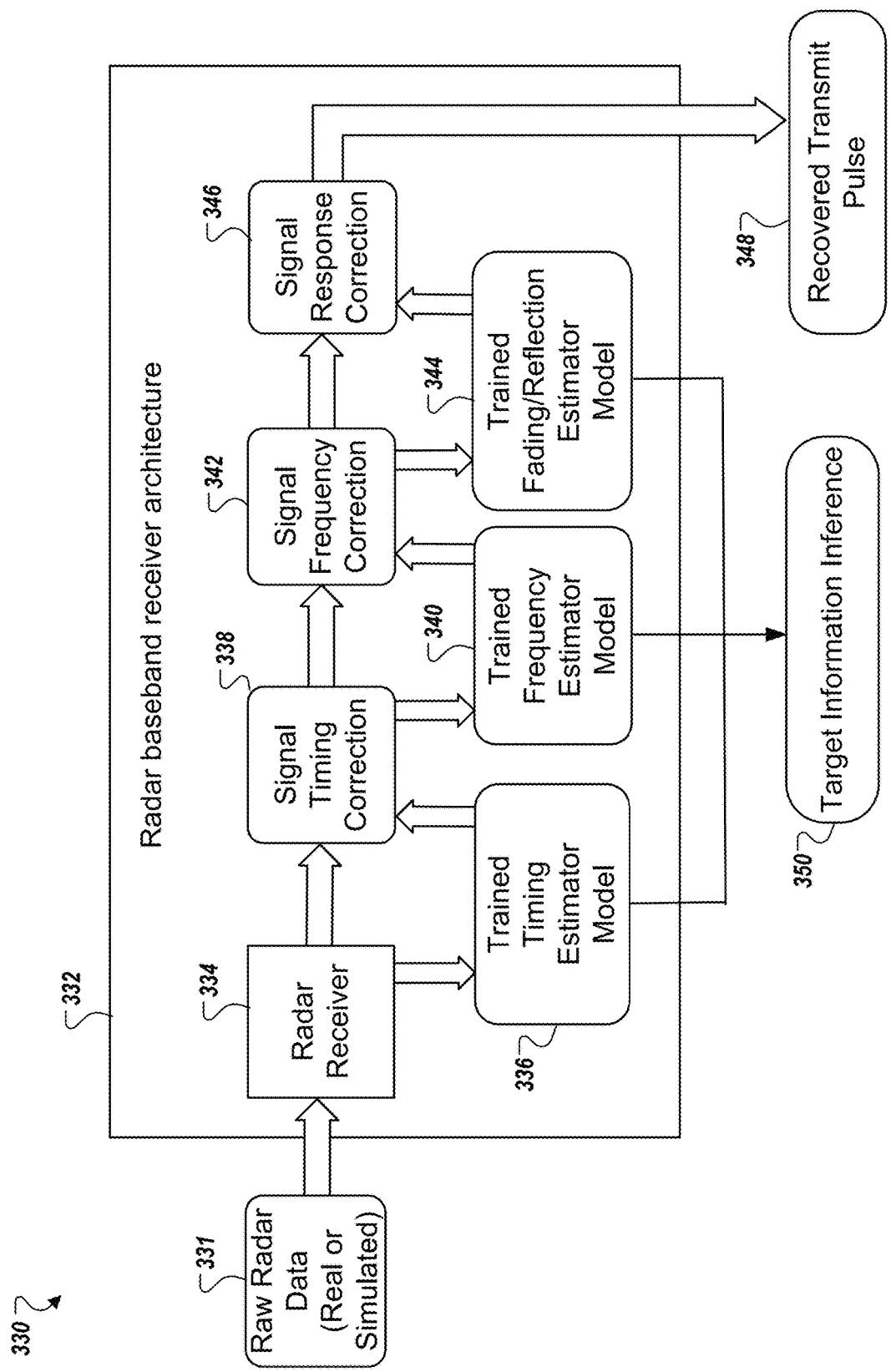
FIG. 3B illustrates an example of deploying one or more learned/trained estimator models into a radar communications system.

FIG. 3B illustrates an example 330 of deploying one or more learned/trained estimator models into a radar communications system or other RF emission analytic system. A radar baseband receiver architecture 332 can include a radar receiver 334, a signal timing correction module 338, a signal frequency correction module 342, and a signal response correction module 346. Three trained timing estimator model 336, a trained frequency estimator model 340, and a trained fading/reflection estimator model 344 can be obtained to estimate channel offsets or channel state information due to different channel effects, corresponding to the signal timing correction module 338, the signal frequency correction module 342, and the signal response correction module 346. The trained estimator models can produce information about time and frequency response of a transmitted radar signal 331 (e.g., a pulse or multiple pulses or other learned radar waveforms). Estimates from the trained estimator models can be used to obtain target information inference 350 which describes one or more objects reflecting the radar signal 331. For example, the estimates can describe a motion of a target, a distance to targets, radar cross sections or other identifying information about a target. In some cases, after these effects are removed, a clean recovered transmit pulse 348 is obtained, which has been time, frequency, and fading/reflection corrected from channel offsets due to the channel effects.

The radar baseband receiver architecture 332 can be applied and inserted into a set of exemplary devices in which the estimation inference sequence can be realized, including automotive radar processors, aeronautical radar systems, maritime radar systems, or any other radar system.

Figure 3C:
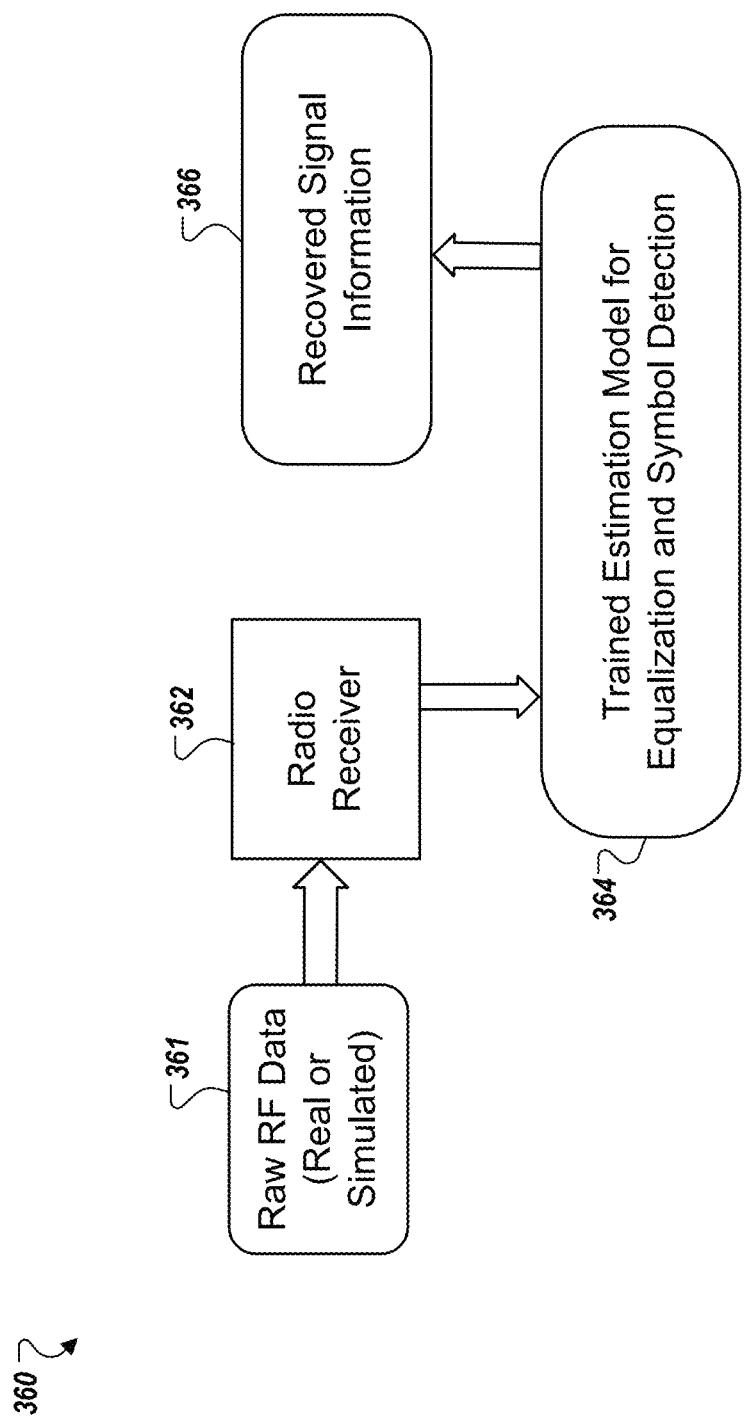
FIG. 3C illustrates an example of deploying one or more learned/trained estimator models into a radio communications system including joint equalization and symbol detection.

FIG. 3C illustrates an example 360 of deploying a learned/trained estimator model 364 into a radio communications system including joint equalization and symbol detection. A raw RF data (real or simulated) 361 is received by a radio receiver 362, and the estimator model 364 can jointly estimate channel response and symbol values associated with the raw RF data 361 to obtain recovered signal information 366. Equalization and symbol slicing functions can be replaced with the joint estimator model 364 for both equalization and symbol detection that is trained leveraging example transmitted information and ground truth information about the channel and transmitted information, as illustrated in FIGS. 2A-2C. Additional processing steps can occur prior to the estimation/mapping, for example signal detection or alignment, which can use learned estimator/detection models, or traditional analytic models such as energy detection/CFO estimation equations, depending on different applications or implementations.

Example Estimator Training and Deployment

In the following, example estimator training and deployment is illustrated, particularly in reception of single carrier modulated phase-shift keying (PSK) signals. Carrier frequency offset (CFO) estimation and timing estimation are used to recover the time and frequency of a received signal transmission to enable demodulation and information recovery.

For illustration only, herein a learned estimator generation relies on construction, training and evaluating an artificial neural network (ANN) based on a representative dataset. ANNs can be used for regression tasks involving signal processing tasks or transformations. Improvements in gradient descent, regularization, network architecture and activation functions, as well as the use of many-core compute platforms such as graphics processing units (GPUs) can be applied in the ANN to realize and train very large networks rapidly. For example, deep learning where training very large neural networks can be accomplished with commercial hardware and open source software such as TensorFlow, Caffe, PyTorch and Keras, and deep learning for physical layer representations and algorithms can be effective and competitive with modern baselines.

To train this ANN model, MSE loss function is used. A large range of model architectures is searched over using Adam to perform gradient descent to optimize for model parameters based on a training dataset. The optimization and model search may be a trade-off where the search is for a model of a minimal or limited complexity which achieves a satisfactory level of performance. Herein the best performing estimator model is chosen based on MSE.

ANN architectures used for performance evaluation can include both stacked convolutional neural networks with narrowing dimensions which map noisy wide initial time series data down to a compact single valued regression output. Different offset estimations can have different ANN network architectures. In the case of CFO estimation architecture shown in Table II, it is found that an average pooling layer works well to help improve performance and generalization of the initial layer feature maps, while in the timing estimation architecture in table III no-pooling, or max-pooling tends to improve estimator accuracy.

TABLE II

ANN architecture for CFO estimation

| Layer | Output dimensions |
|---|---|
| Input | (nsamp,2) |
| Conv1D + ReLU | (variable,32) |
| AveragePooing1D | (variable,32) |
| Conv1D + ReLU | (variable,128) |
| Conv1D + ReLU | (variable,256) |
| Linear | 1 |

TABLE III

ANN architecture for timing estimation

| Layer | Output dimensions |
|---|---|
| Input | (2048,2) |
| Conv1D + ReLU | (511,32) |
| Conv1D + ReLU | (126,64) |
| Conv1D + ReLU | (30,128) |
| Conv1D + ReLU | (2,256) |
| Dense + Linear | (1) |

Performance Analysis

Performance of learned estimators is evaluated in comparison with analytical estimators (or expert estimators).

An expert estimator for center frequency offset estimation can use an FFT (fast Fourier transform) based technique which estimates the frequency offset by using a periodogram of the $m^{th}$ power of the received signal. The frequency offset detected by this technique is then given by the following expression:

$$\Delta \hat{f} = \frac{F_s}{N \cdot m} \operatorname*{argmax}_{f} \left| \sum_{k=0}^{N-1} r^m[k] e^{-j2\pi kt/N} \right|$$

$$\left( -\frac{R_{sym}}{2} \leq f \leq \frac{R_{sym}}{2} \right).$$

where m is the modulation order, r(k) is the received sequence, $R_{sym}$ is the symbol rate, Fs is the sampling frequency, and N is the number of samples. The algorithm searches for a frequency that maximizes the time average of the $m^{th}$ power of the received signal over various frequencies in the range of ($-R_{sym}/2 \leq f \leq R_{sym}/2$). Due to the algorithm operating in the frequency domain, the center frequency offset manifests as the maximum peak in the spectrum of $r^m(k)$.

An expert estimator for timing offset estimation can be performed by matched filtering the received sequence to a known preamble sequence. The time-offset which maximizes the output of the matched filter's convolution is then taken to be the time-offset of the received signal. Matched filtering can be represented by the following expression:

$$y[k] = \sum_{k=-\infty}^{k=\infty} h[n-k]r[k],$$

where h[k] is the preamble sequence. The matched-filter is known as the optimal filter for maximizing the signal to noise ratio (SNR) in the presence of additive stochastic white noise.

Figure 4A:
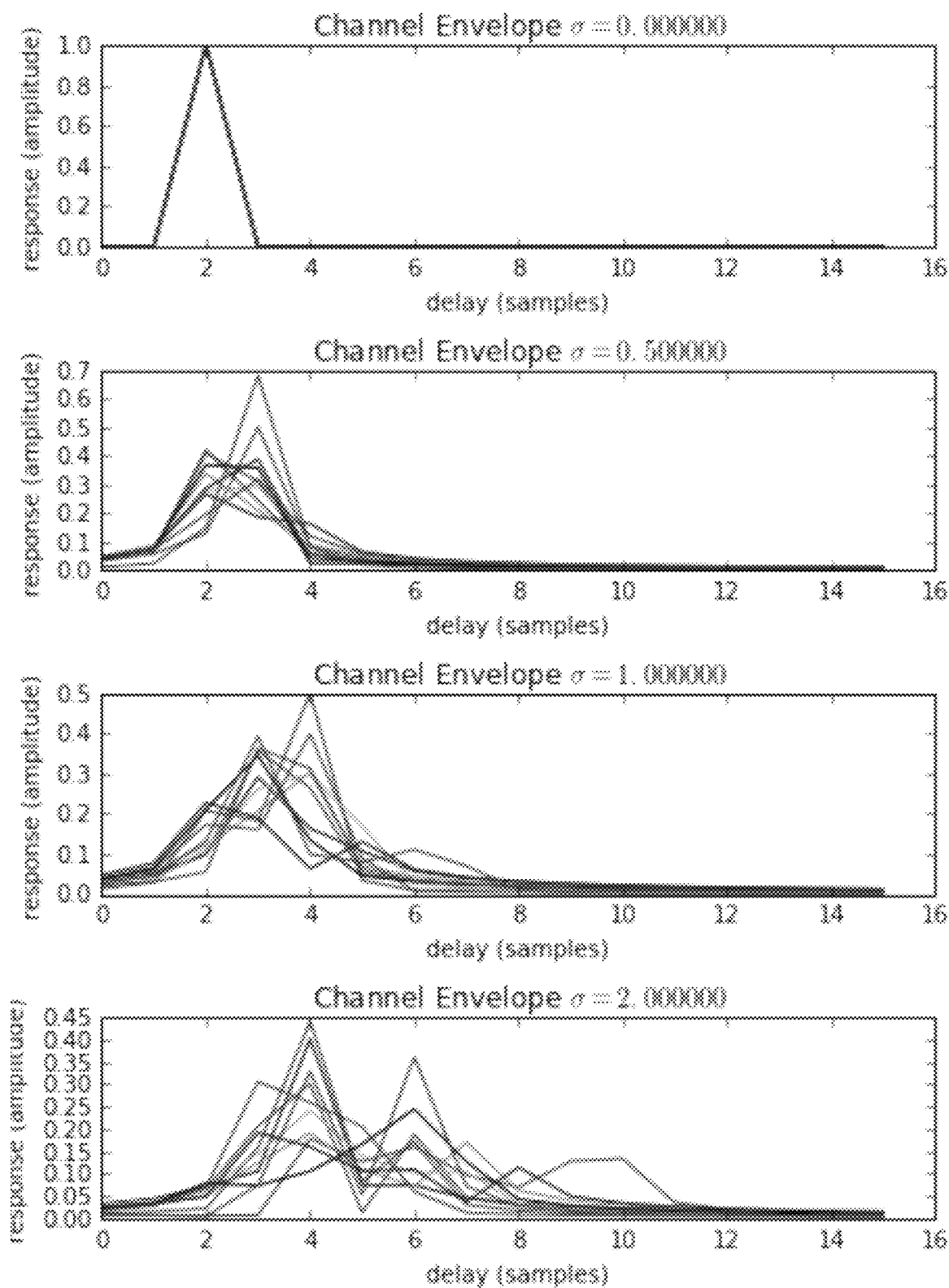
FIG. 4A illustrates example impulse response modes of a number of channels for delay spreads.

Two different sets of data are generated, partitioned into training and test sets, and used respectively to compare the performance of timing estimation and carrier frequency estimation methods. All generated data are based off of quadrature phase shift keying (QPSK) bursts with random IID (independent and identically distributed) symbols, and shaped with a root-raised-cosine pulse shaping filter (RRC)-filter with a roll-off β=0.25 and a filter span of 6, and sampled at 400 kHz with a symbol rate of 100 kHz. Four channel conditions, additive white Gaussian noise (AWGN) with no fading (σ=0), and three cases of Rayleigh fading with varying mean delay spreads in samples of σ=0.5, 1, 2. Amplitude responses for a number of complex valued channel responses for each of these delay spreads are shown in FIG. 4A to provide some visual insight into the impact of Rayleigh fading effects at each of these delays. For the last case, significant inter-symbol interference (ISI) is present in the data.

The first dataset generated is the timing offset estimator dataset, in which the burst is prepared with a known preamble of 64 symbols and random noise samples at the same SNR as the data portion of the burst. The number of noise samples prepended is drawn from a μ~(0, 1.25), in units of milliseconds to create timing offset ambiguity. Additionally, a random phase offset drawn from a μ~(0, 2π) is introduced for each burst in the dataset to create arrival phase ambiguity.

The second dataset generated is the center frequency offset estimator data, in which every example burst has a center frequency offset drawn from a μ~(-50e3, 50e3) distribution, in units of Hz. The bounds of this correspond to half the symbol rate, $R_{sym}$=2. Additionally, a random phase offset drawn from a μ~(0, 2π) is introduced for each burst in the dataset.

These datasets are generated for SNR's of 0 dB, 5 dB, and 10 dB and for an AWGN channel and three different Rayleigh fading channels with different mean delay spread values (0.5, 1, and 2) representing different levels of reflection in a given wireless channel environment. The label of the timing offset and center frequency offsets are stored as ground truth information for training and evaluation.

For each dataset described above, when training the ANN based estimator, network weights are optimized using Adam for 100 epochs, reducing the initial learning rate of 1e-3 by a factor of two for each 10 epochs with no reduction in validation loss, ultimately using the parameters corresponding to the epoch with the lowest validation loss. With the datasets generated above, the test error is computed using a separate data partition between input and target values used for training, and predicted values generated using both expert and deep learning/ANN based estimators. The standard deviation of the estimator error is used as a metric for comparison.

Figure 4B:
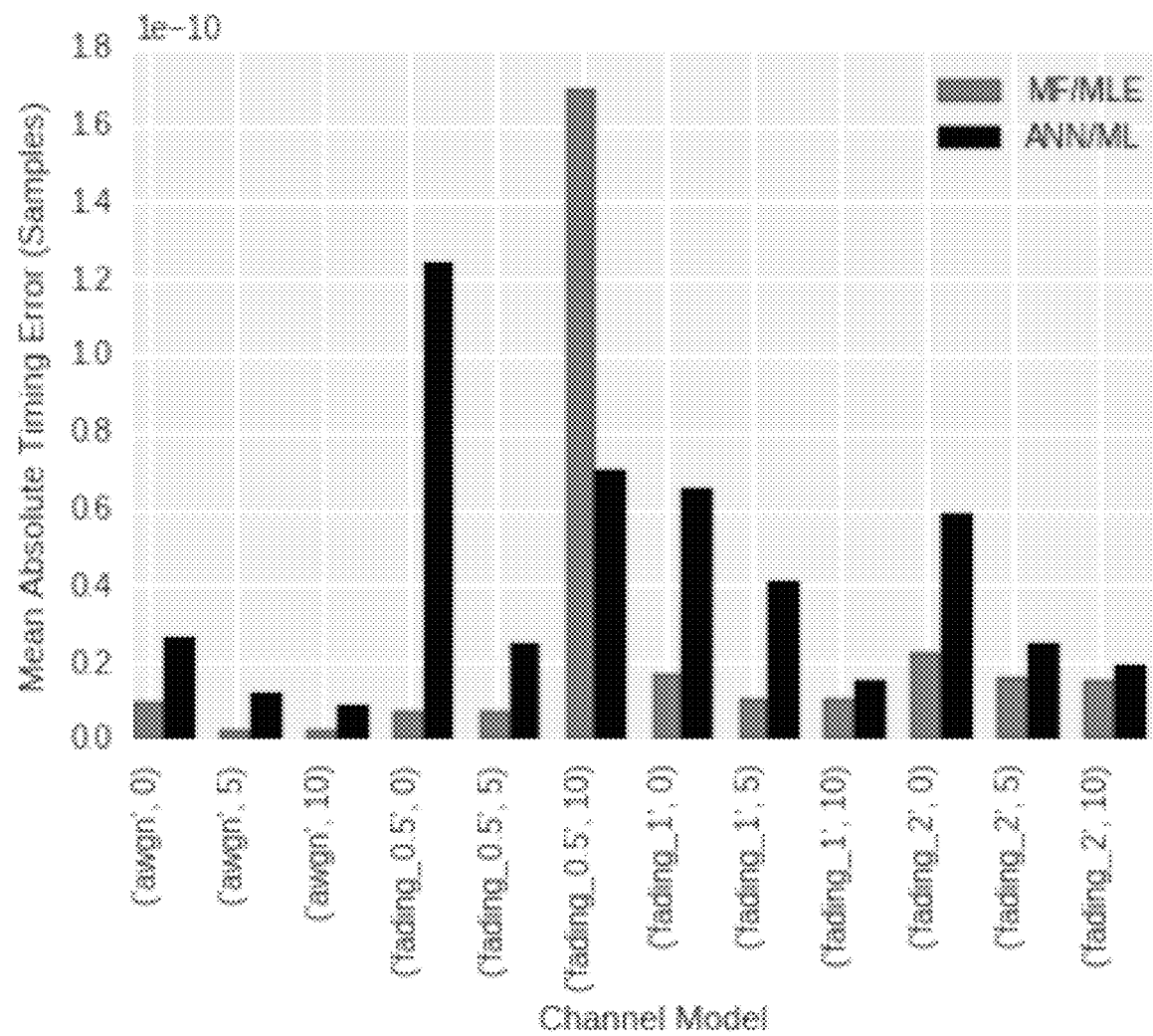
FIG. 4B illustrates timing estimation mean error comparison between traditional matched filtering maximum likelihood (MF/MLE) approach and artificial neural network/machine learning (ANN/ML) estimator approach.

FIG. 4B illustrates timing estimation mean error comparison between traditional matched filtering maximum likelihood (MF/MLE) approach and artificial neural network/machine learning (ANN/ML) estimator approach. It is found that the traditional matched filtering maximum likelihood approach (MF/MLE) achieves excellent performance under the AWGN channel condition. However, significant degradation of the MF/MLE baseline accuracy under the fading channel models is observed as a simple matched filter MLE timing estimation approach has no ability to compensate for the expected range of channel delay spreads. In contrast, in this case the artificial neural network/machine learning (ANN/ML) estimator approach on average cannot quite attain equivalent performance in all or even most cases. However, this approach does attain an average absolute error within the same order of magnitude, and does in some fading cases achieve a lower mean absolute error in the case of a fading channel. As additional impairments and channel effects such as hardware induced non-linearities are introduced, it is expected that the ANN/ML approach can improve, while the MF/MLE approach can not.

Figure 4C:
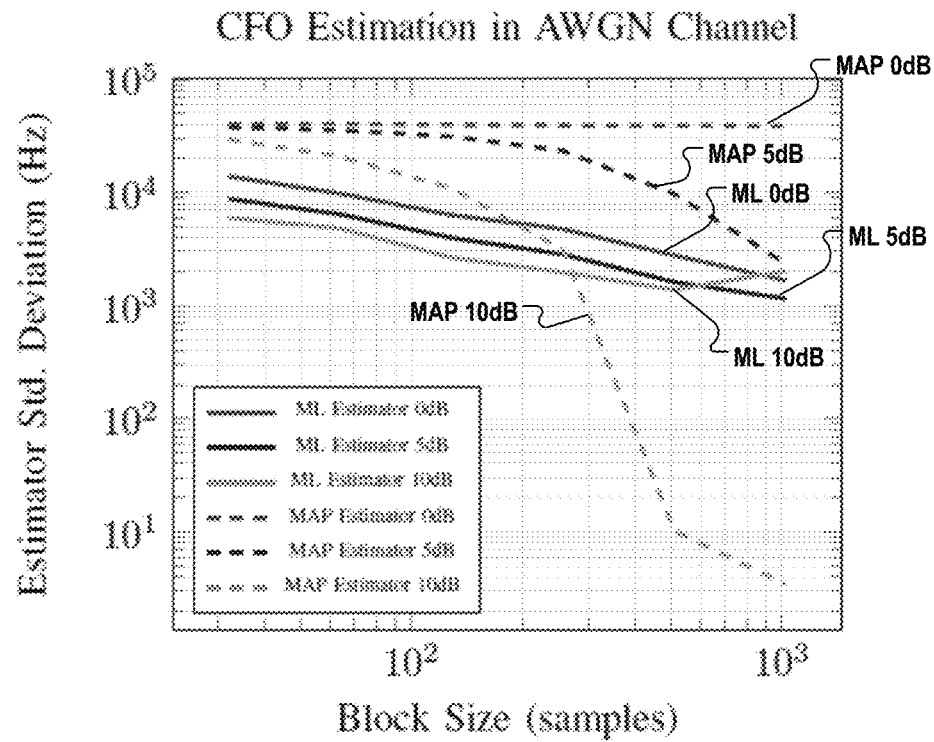
FIG. 4C illustrates mean carrier frequency offset (CFO) estimation error for additive white Gaussian noise (AWGN) channel with no fading.
Figure 4D:
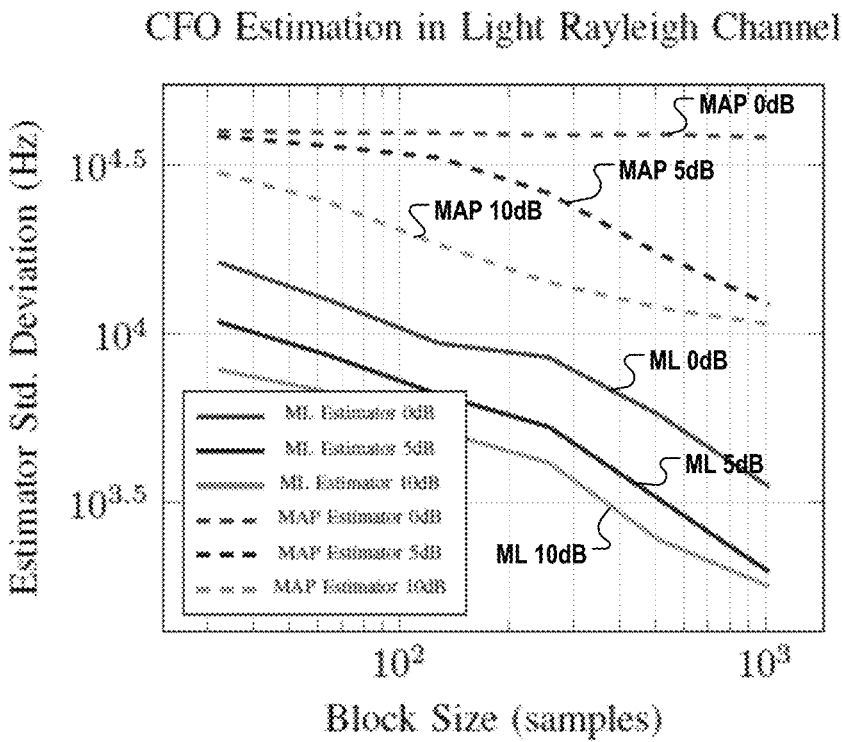
FIGS. 4D-4F illustrate CFO estimation errors for Rayleigh channels with a light fading (FIG. 4D), a medium fading (FIG. 4E), and a heavy fading (FIG. 4F).
Figure 4E:
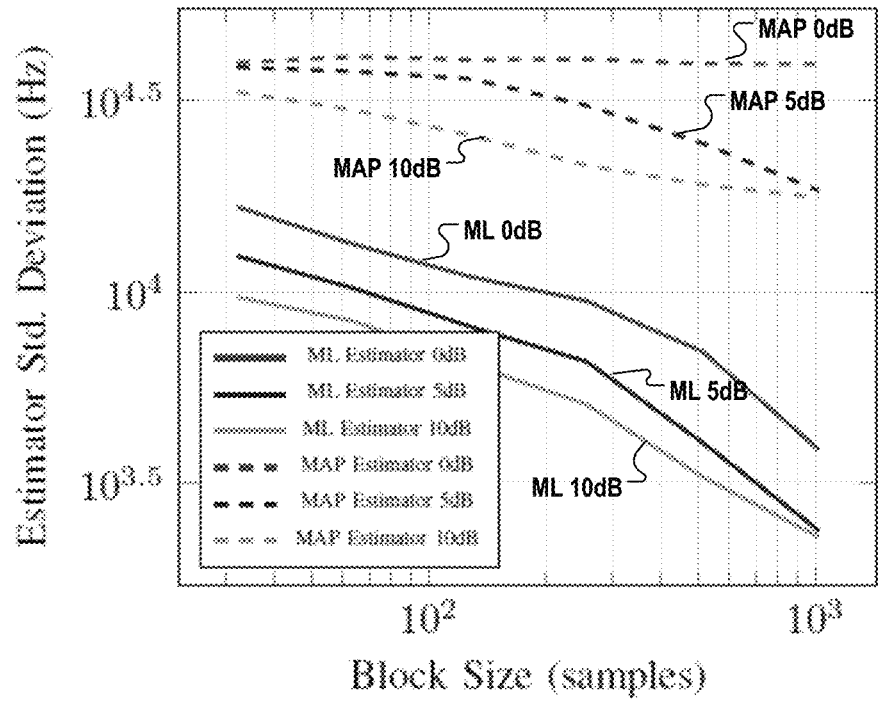
Figure 4F:
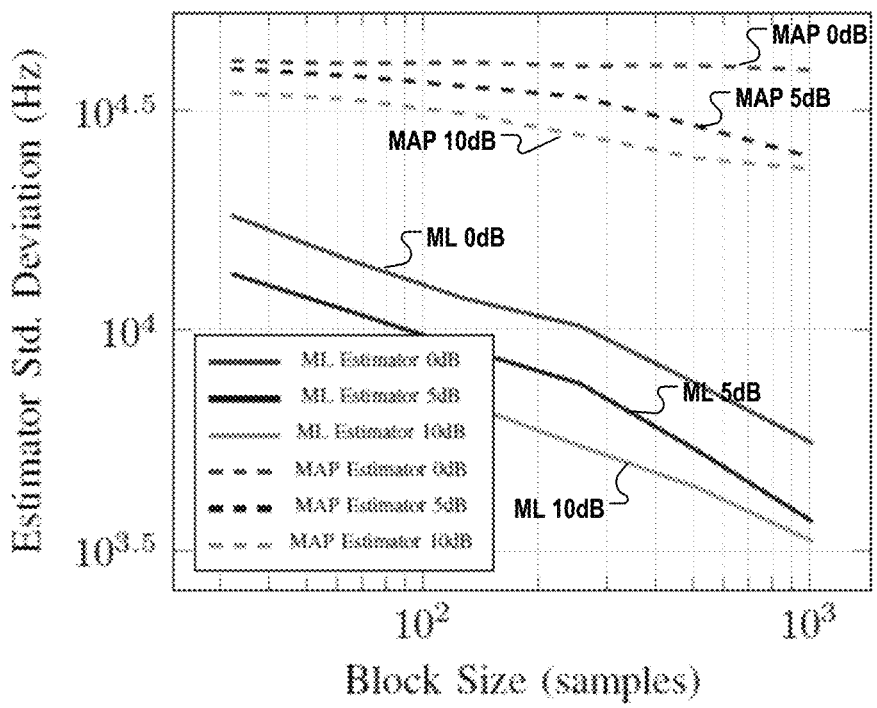

Quantitative results for estimation of center frequency offset error are shown in FIGS. 4C to 4F, where FIG. 4C illustrates mean carrier frequency offset (CFO) estimation error for additive white Gaussian noise (AWGN) channel with no fading. FIGS. 4D-4F illustrate CFO estimation errors for Rayleigh channels with a light fading (FIG. 4D), a medium fading (FIG. 4E), and a heavy fading (FIG. 4F). The quantitative results for estimation summarize the performance of both the baseline maximum likelihood (MLE) method with dashed lines and the ANN/ML method with solid lines. The mean absolute center frequency estimate error is compared for each method at a range of different estimator block input length sizes. As moment based methods generally improve for longer block sizes, we compare performance over a range of short-time examples to longer-time examples.

In the AWGN case, in FIG. 4C, it is shown that for 5 and 10 dB SNR cases, by the time we reach a block size of 1024 samples, the baseline (MAP) estimator is doing quite well, and for larger block sizes (above 1024 samples) with SNR of at least 5 dB, performance of the baseline method is generally better. However, even in the AWGN case, for small block sizes, lower error using the ANN/ML approach, even at low SNR levels of near 0 dB, can be achieved.

In the cases of fading channels (which represents most practical channels in the real world) shown in FIGS. 4D to 4F, it is shown that performance of the baseline estimator degrades enormously from the AWGN case under which it was derived when delay spread is introduced. Performance gets perpetually worse as σ increases from 0.5 to 2 samples of mean delay spread. In the case of the ANN/ML estimator, it is shown that a degradation of estimator accuracy as delay spread increases, but the effect is not nearly as dramatic, ranging from 3.4 to 23254 Hz in the MLE case (almost a 7000× increase in error) versus a range of 2027 to 3305 Hz in the ML case (around a 1.6× increase in error). This illustrates the capacity of learn estimators to cope better with higher levels of impairment than simplified analytic models which can often degrade rapidly.

The computational complexity of the expert estimators and this example of neural network based estimators can be evaluated. Table V compares the approximate number of floating point operations (FLOPs) required to compute the center frequency offset estimate for both the expert estimator described above, and the neural network based estimator.

TABLE V

CFO Flop Count

| Sample Size | Expert Estimator (MFlop) | NN Estimator (MFlop) |
|---|---|---|
| 32 | 5.374 | 3.01 |
| 64 | 5.374 | 2.89 |
| 128 | 5.374 | 4.36 |
| 256 | 5.374 | 6.92 |
| 512 | 5.374 | 12.59 |
| 1024 | 5.374 | 23.71 |

The FLOP counts for the expert estimator were derived by using the FFTW estimate for the number of flops used to compute an FFT, which scales with the FFT size, N, as $5N \log_2(N)$. The FLOP counts reported are a function of the desired CFO frequency estimation resolution (1 Hz), the sampling frequency (400 kHz), and the input sequence length (parameterized in the table). It is noticed in Table V that the expert estimator FLOP counts do not change with an increasing input sequence length. This is because the FFT size used is, in this case, dominated by the desired frequency resolution of 1 Hz, rather than the input sequence length in this particular scenario.

The complexity of each layer of the neural network may be computed by considering the number of adds and multiplies within each layer. These are given in terms of number of filter length L, input channels chi, output channels $ch_o$, output width K, input size Ni and output size No and pool size p. Table IV enumerates the complexity of each layer type in terms of multiplies and adds as a function of layer parameters.

TABLE IV

Approx. Layer Complexity

| Layer/Op | Expression |
|---|---|
| Conv1D/Mul | $L * ch_i * ch_o * K$ |
| Conv1D/Add | $L * (ch_i + 1) * ch_o * K$ |
| Dense/Mul | $N_i * N_o$ |
| Dense/Add | $(N_i + 1) * N_o$ |
| AvgPool/Add | $N_o * p$ |

In the case of the ANN complexity measurement, it is observed that for small networks lower complexity (rather than taking a high-resolution FFT) can be obtained. While for the larger example sizes, a worst case of 5-10× more operations per estimation is performed. ANN architectures can be further optimized to minimize complexity beyond the initial complexity numbers provided here. When observing the complexity per layer for instance, it is clear that certain layers (for instance with large filter sizes) dominate the operation count, where they could likely be easily alleviated with smaller filter sizes and to obtain similar performance. Effects of architecture optimization and reduced data representation precision can likely yield a complexity reduction on the order of 10-100× from these floating point numbers, providing an extremely competitive low-complexity estimator approximation with the baseline.

Similarly, Table VI shows the approximate number of floating point operations used to estimate the timing offset by both the expert estimators and the neural network based estimators. The bulk of the FLOPs used for the estimation using the expert estimator depend on the input sequence length, because a matched filter can correlate across the entire sequence to find the optimal starting point.

TABLE VI

Timing Flop Count

| Sample Size | Expert Estimator (MFlop) | NN Estimator (MFlop) |
|---|---|---|
| 1024 | 1.05165 | 9.35 |

Optimization of analytically derived and statistically well-formed estimators is a nontrivially difficult process under channel and signal models of high complexity. In some cases existing benchmark expert estimators such as the matched filter perform well, while learned estimator methods resulting in the same order of magnitude can be obtained readily given sufficient good labeled data and limited signal knowledge (for instance the ML timing estimator had no knowledge of the preamble used, the modulation type, the pulse shaping filter, etc.) which potentially offers a lower implementation complexity if the cost of obtaining good labeled data is lower than that of imparting all the known reference signal information into the expert estimator.

In center frequency estimation, under ideal channel condition under which many commonly used estimators are derived, performance is very good for large block size and high SNR cases, offering a level of precision. However, at lower SNR levels, for smaller block sizes, and for harsh non-impulsive fading channel conditions the learned ANN based estimator approach can offer significant potential for improvement.

From a complexity standpoint the ANN estimator complexity is within the same order of magnitude as the expert estimators in some cases, and can be significantly lower in complexity given additional optimization.

Approximate estimation based on regression of large datasets can be an extremely promising avenue of research when building practical engineering systems. There are conditions such as short time, low-SNR conditions, and under harsh impairments, where accuracy gains can be achieved against current baselines, and there are also conditions where complexity reduction can be attained to reduce the computational complexity, size, weight, and power required to obtain a comparable estimate. All of these properties can be traded in an engineering system design when selecting a design approach. The learned estimator approach can reduce the computational complexity through additional architecture optimization and conditions characterization.

Example Methods

Figure 5A:
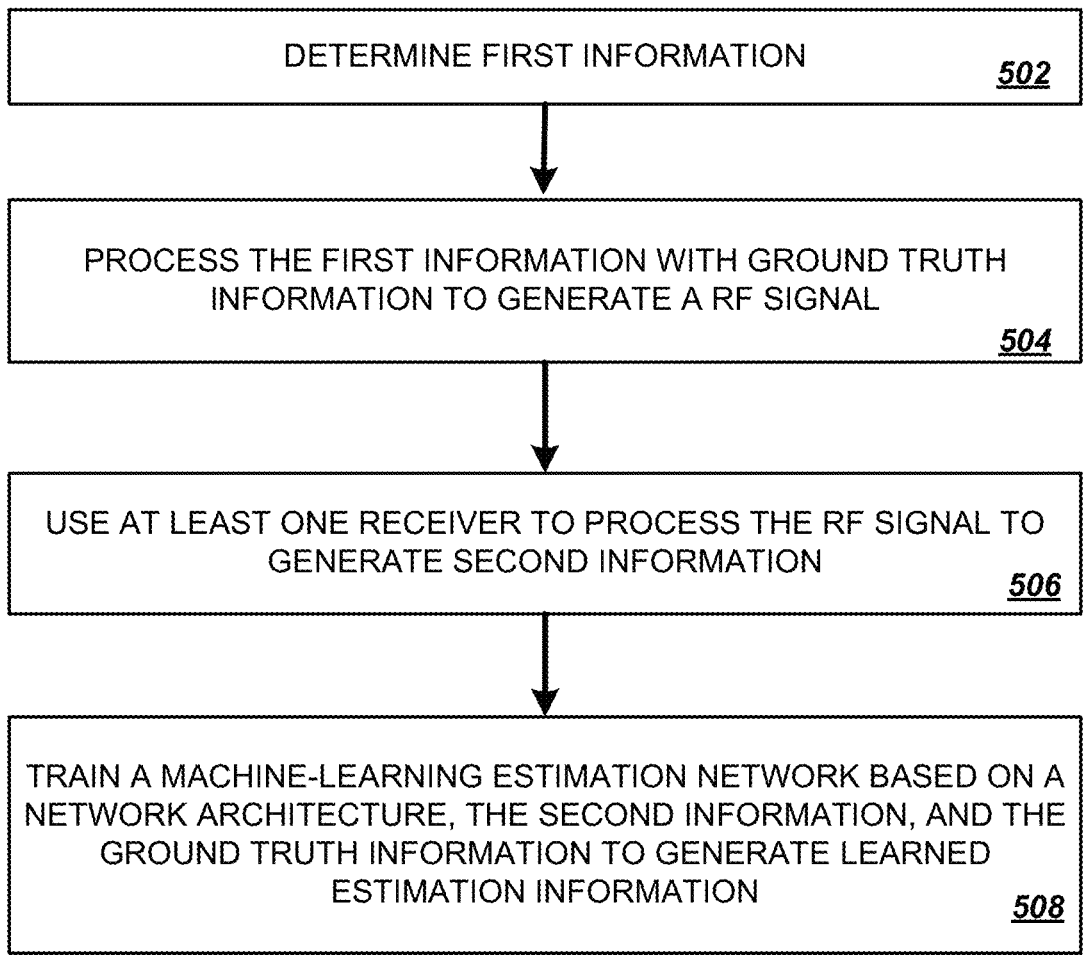
FIG. 5A is a flowchart illustrating an example method of training a machine-learning estimation network.

FIG. 5A is a flowchart illustrating an example method 500 of training a machine-learning estimation network. The method 500 can be performed by one or more processors, such as one or more CPUs, GPUs, DSPs, FPGAs, ASICs, TPUs, or neuromorphic chips or vector accelerators that execute instructions encoded on a computer storage medium. The method 500 can be performed by a RF system, e.g., the RF system 200 of FIG. 2A, the RF system 230 of FIG. 2B, or the RF system 260 of FIG. 2C.

The training method 500 includes determining first information (502), which may be information that is to be communicated over an RF channel. As discussed above, the first information may be any suitable discrete-time, analog, discrete-valued, or continuous-valued information. In some cases, this input information may be whitened discrete bits or symbols, or in other cases it may follow the distribution of a non-whitened information source.

The first information is processed with ground truth information to generate a RF signal (504). The RF signal can be transmitted over a communication channel.

In some implementations, the first information is modulated with at least one modulation parameter using a modulation method, e.g., a digital quadrature amplitude modulation (QAM), phase-shift keying (PSK), or orthogonal frequency-division multiplexing (OFDM). The at least one modulation parameter can be covered out as at least one portion of the ground truth information to the machine-learning estimation network.

In some implementations, the first information is encoded with at least one encoding parameter by an encoder that can be implemented as an encoder machine-learning network. The at least one encoding parameter can be conveyed out as at least one portion of the ground truth information to the machine-learning estimation network. This encoding process may utilize any suitable mapping from an input information space into an RF signal space.

After the modulation or encoding, the first information can be altered by a channel impairment to generate the RF signal. The channel impairment can have at least one channel effect associated with the communication channel. The at least one channel effect can include at least one portion of the ground truth information including channel state information. The channel state information can include at least one of a frequency offset, a timing offset, a phase offset, a noise value, a rate offset, or a fading tap.

As discussed above, the channel impairment can be real or simulated. In some cases, the channel impairment includes real channel impairment. Data associated with the first information can be transmitted over the communication channel, and ground truth channel state information, which can be as at least one portion of the ground truth information, can be obtained based on a measurement of the communication channel. In some cases, the channel impairment includes simulated channel impairment using at least one channel model.

At least one receiver is used to process the RF signal to generate second information (506). The second information can be further processed to output as an estimator input.

The machine-learning estimation network is trained based on a network architecture, the second information as the estimator input, and one or more items of the ground truth information as estimator target outputs, to generate learned estimation information (508).

The machine-learning estimation network can include a neural network, e.g., an ANN, a DNN, a CNN, a RNN, or a ResNet. The network architecture can include definitions of at least one of network connections and hyper-parameters of the machine-learning estimation network. The machine-learning estimation network can be trained by performing optimization in the machine-learning estimation network to leverage the estimator input and the estimator target outputs to obtain an optimized set of model parameters as the learned estimation information. The optimized set of model parameters can include at least one of weights, biases, and hyper-parameters that allow the machine-learning estimation network to approximate outputs which closely match the estimator target outputs when given the estimator input. The optimization can include stochastic gradient descent (SGD), Adam, or similar. The optimization in the machine-learning estimation network can be performed by minimizing a loss function including one of a mean-squared error (MSE) loss function, a mean absolute error (MAE) loss function, cross-entropy loss, f-divergence loss, a log-cosine hyperbolic loss function, and a Huber loss function.

In some implementations, the training method performs correction for estimated offset or effect based on the second information and the learned estimation information. A decoder can be used to process the correction for the estimated offset or effect to determine an update for the learned estimation information based on ground truth information of the first information. In some cases, a phenomena specific correction routine such as a frequency-shifter can apply an estimator output to perform a correction. In other cases, the output of the estimator may constitute useful information to derived information about physical world phenomena or dynamics without correction.

The encoder can implement an encoding mapping that is based on results of training an encoder machine-learning network and the decoder can implement a decoding mapping that is based on results of training a decoder machine-learning network, and the encoder machine-learning network and the decoder machine-learning network have been jointly trained as an auto-encoder to learn the learned estimation information together with the machine-learning estimation network. At least one of the encoder machine-learning network or the decoder machine-learning network can include at least one of a deep dense neural network (DNN) or a convolutional neural network (CNN) having a series of parametric multiplications, additions, and non-linearities. As noted above, for example with reference to FIG. 2C, the three learned networks including the machine-learning estimation network, the encoder machine-learning networking and the decoder machine-learning network can optimize jointly to train the estimation network and determine encoder and decoder weight updates.

Figure 5B:
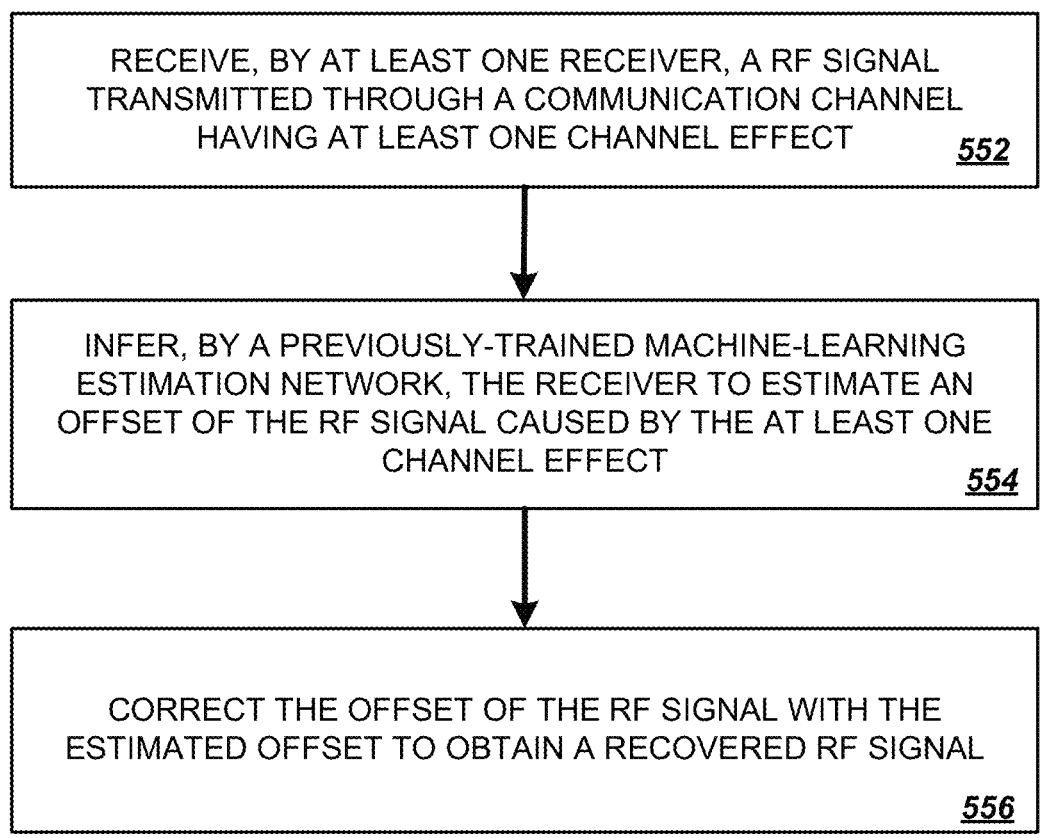
FIG. 5B is a flowchart illustrating an example method of deploying a machine-learning estimation network in a communications system.

FIG. 5B shows a flowchart illustrating an example method 550 of deploying a machine-learning estimation network in a communications system. The method 550 can be performed by one or more processors, such as one or more CPUs, GPUs, DSPs, FPGAs, ASICs, TPUs, or neuromorphic chips or vector accelerators that execute instructions encoded on a computer storage medium. The method 550 can be performed by a RF system, e.g., the RF system 300 of FIG. 3A, the RF system 330 of FIG. 3B, or the RF system 360 of FIG. 3C.

At least one receiver receives a RF signal transmitted through a communication channel having at least one channel effect (552). The RF signal can be an actual input signal and can be raw RF signal that can be real or simulated.

A previously-trained machine-learning estimation network infers the receiver to estimate an offset of the RF signal caused by the at least one channel effect (554). The machine-learning estimation network can be trained by the method 500 of FIG. 5A. Different machine-learning estimation network can be trained for different channel effects. For example, the trained machine-learning estimation network can include a trained timing estimation model for estimating a timing offset, a trained frequency estimation model for estimating a frequency offset, a trained fading estimation model for estimating a fading tap, or a trained reflection estimation model for estimating a reflection offset, or a trained estimation model for equalization and symbol detection for estimating the equalization and symbol detection.

Offset of the RF signal is corrected with the estimated offset to obtain a recovered RF signal (556). The correction can be performed by the trained machine-learning estimation network or by a known signal processing routine using the estimate such as frequency translation. As noted above, a corresponding module in a radio baseband receiver architecture can be configured to correct the offset of the RF signal using the estimated offset provided by the trained machine-learning estimation network.

In some implementations, as illustrated in FIG. 3A or 3B, a plurality of trained machine-learning estimation networks can be positioned in succession in the communications system to estimate respective offsets corresponding to a plurality of parameters of the RF signal. The offsets can be sequentially removed from the RF signal. In some implementations, the plurality of machine-learning estimation networks can be executed in parallel from the same input data, and their estimates may be analyzed.

In some implementations, at least one of an encoder or a decoder in the communications system is updated based on feedback information generated by the previously-trained machine-learning estimation network, the feedback information being associated with the estimated offset. In some examples, at least one of the encoder or the decoder based on the feedback information can be updated by determining a channel mode, from among a plurality of channel modes, that represents a state of the communication channel based on the feedback information and updating at least one of the encoder or the decoder based on the channel mode of the communication channel.

Figure 6A:
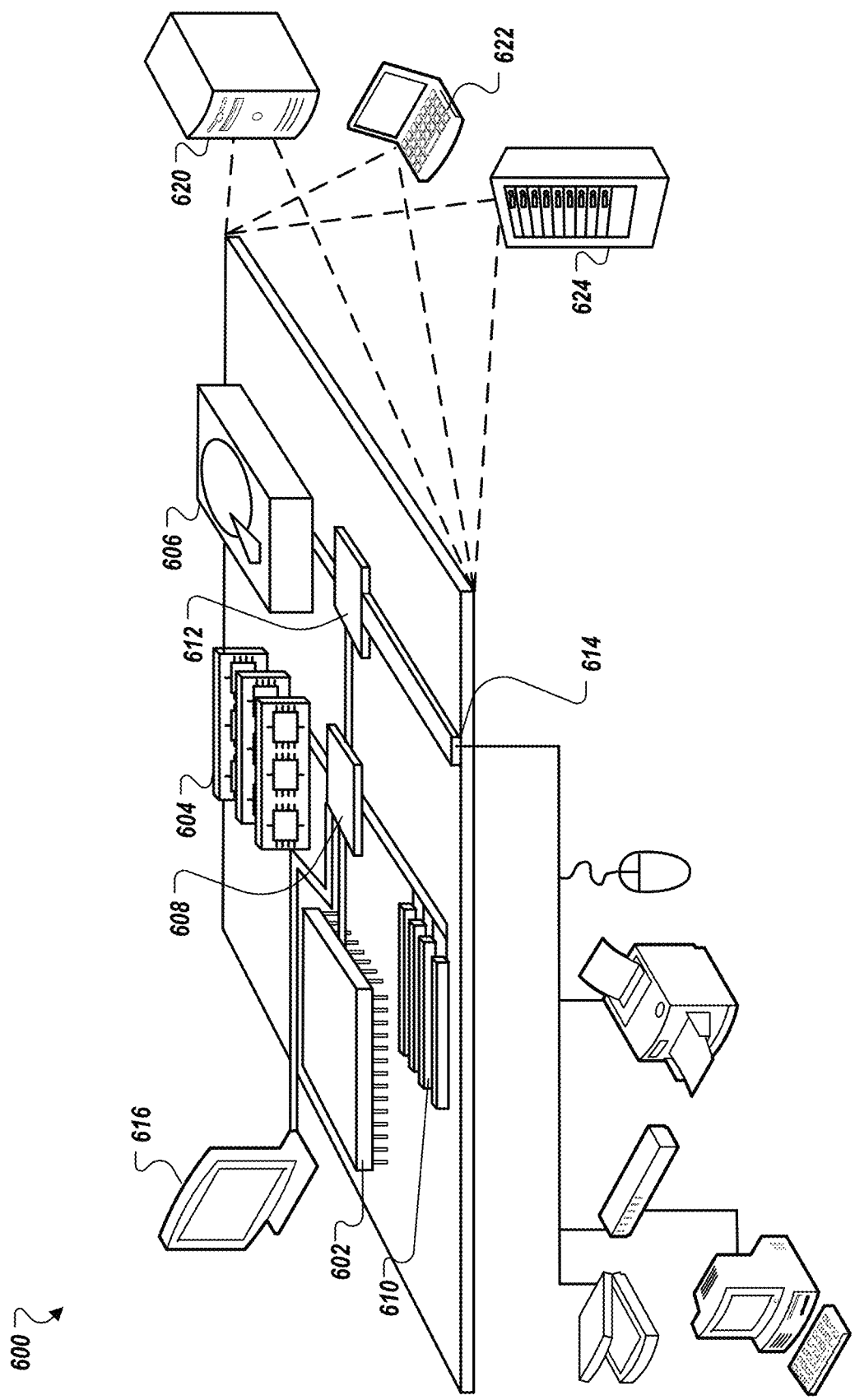
FIGS. 6A and 6B are diagrams illustrating examples of a computing device and a mobile computing device, respectively, that can control processing of an RF signal using a machine-learning network.
Figure 6B:
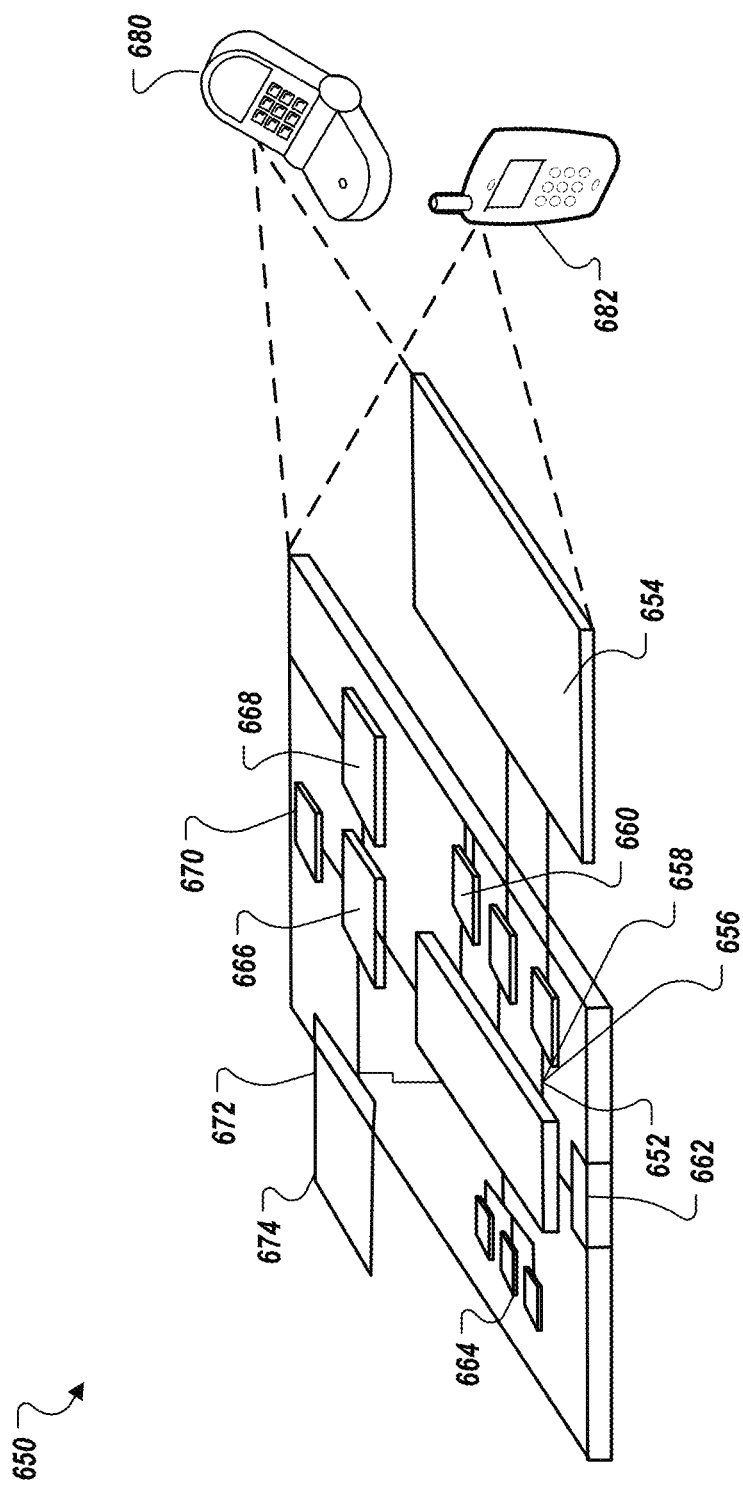

FIGS. 6A and 6B are diagrams illustrating examples of a computing device 600 and a mobile computing device 650, respectively, that can control processing of an RF signal using a machine-learning network. For example, one or more parts of a machine-learning network that executes policies for control of radio signal transmission, reception and processing hardware (e.g., radio stages 109 and controllers 119, or radios stages 309 and controller 319) could be implemented by the computing device 600 or the mobile computing device 650.

The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

As shown in FIG. 6A, the computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 602 is a single-threaded processor. In some implementations, the processor 602 is a multi-threaded processor. In some implementations, the processor 602 is a quantum computer. In some implementations, the processor 602 executes a machine-learning network corresponding to policies for control of radio signal transmission, reception and processing hardware, as described above.

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk. In some implementations, the memory 604 is similar to the memory 130, or the memory 330, e.g., the memory 604 stores past observations and storage that are used by the machine-learning network, executed by the processer 602, to control radio signal transmission, reception and processing hardware.

The storage device 606 is capable of providing mass storage for the computing device 600. In some implementations, the storage device 606 may be or include a computer-readable medium, such as a floppy disk device, a hard disk device, an optical disk device, or a tape device, a flash memory or other similar solid-state memory device, or an array of devices, including devices in a storage area network or other configurations. In some implementations, the storage device 606 is similar to the memory 130, or the memory 330, e.g., the storage device 606 stores past observations and storage that are used by the machine-learning network, executed by the processer 602, to control radio signal transmission, reception and processing hardware.

Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602). The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device, such as a mobile computing device 650. Each of such devices may include one or more of the computing device 600 and the mobile computing device 650, and an entire system may be made up of multiple computing devices communicating with each other.

As shown in FIG. 6B, the mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650. In some implementations, the processor 652 executes a machine-learning network corresponding to policies for control of radio signal transmission, reception and processing hardware, as described above. For example, the processor 652 can be an RFIC, as described with respect to FIG. 4.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

In some implementations, the memory 664 is similar to the memory 130, or the memory 330, e.g., the memory 664 stores past observations and storage that are used by the machine-learning network, executed by the processer 652, to control radio signal transmission, reception and processing hardware.

The memory 664 may include, for example, flash memory and/or NVRAM memory (non-volatile random access memory), as discussed below. In some implementations, instructions are stored in an information carrier such that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry. The communication interface 666 may provide for communications under various modes or protocols, such as GSM voice calls (Global System for Mobile communications), SMS (Short Message Service), EMS (Enhanced Messaging Service), or MIMS messaging (Multimedia Messaging Service), CDMA (code division multiple access), TDMA (time division multiple access), PDC (Personal Digital Cellular), WCDMA (Wideband Code Division Multiple Access), CDMA1350, or GPRS (General Packet Radio Service), LTE, 5G/6G cellular, among others. Such communication may occur, for example, through the transceiver 668 using a radio frequency. In addition, short-range communication may occur, such as using a Bluetooth, Wi-Fi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

The term "system" as used in this disclosure may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general-purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

What is claimed is:

1. A method performed by at least one processor to train at least one machine-learning estimation network, the method comprising:
    processing first information with ground truth information to generate a radio frequency (RF) signal;
    using a receiver to process the RF signal to generate second information; and
    training the machine-learning estimation network based on a network architecture, the second information as an estimator input, and one or more items of the ground truth information as one or more estimator target outputs to generate learned estimation information.

2. The method of claim 1, wherein processing the first information comprises:
    altering the first information by a channel impairment having at least one channel effect.

3. The method of claim 2, wherein the channel impairment comprises real channel impairment,
    wherein altering the first information comprises transmitting data associated with the first information over a communication channel, and
    wherein the method further comprises obtaining at least one portion of the ground truth information based on a measurement of the communication channel.

4. The method of claim 2, wherein the channel impairment comprises simulated channel impairment using at least one channel model.

5. The method of claim 2, wherein the at least one channel effect comprises at least one portion of the ground truth information including channel state information.

6. The method of claim 5, wherein the channel state information comprises at least one of a frequency offset, a timing offset, a phase offset, a noise value, a rate offset, a multiple-input and multiple-output (MIMO) equalization offset, an interpolated pilot response offset, an impulse response modification, a fading effect, or a hardware distortion.

7. The method of claim 2, wherein processing the first information comprises modulating the first information with at least one modulation parameter,
    wherein the method further comprises conveying out the at least one modulation parameter as at least one portion of the ground truth information to the machine-learning estimation network.

8. The method of claim 2, wherein processing the first information further comprises using an encoder to encode the first information with at least one encoding parameter,
    wherein the method further comprises conveying out the at least one encoding parameter as at least one portion of the ground truth information to the machine-learning estimation network.

9. The method of claim 8, further comprising:
    performing correction for estimated offset or effect based on the second information and the learned estimation information.

10. The method of claim 9, further comprising:
    using a decoder to process the correction for the estimated offset or effect to determine an update for the learned estimation information based on ground truth information of the first information.

11. The method of claim 10, wherein the encoder implements an encoding mapping that is based on results of training an encoder machine-learning network and the decoder implements a decoding mapping that is based on results of training a decoder machine-learning network, and
    wherein the encoder machine-learning network and the decoder machine-learning network have been jointly trained as an auto-encoder to learn the learned estimation information together with the machine-learning estimation network.

12. The method claim 11, wherein at least one of the encoder machine-learning network or the decoder machine-learning network comprises at least one of a deep dense neural network (DNN) or a convolutional neural network (CNN) comprising a series of parametric multiplications, additions, and non-linearities.

13. The method of claim 8, further comprising:
    determining, by a decoder, a reconstruction loss based on the first information and the second information;
    determining, by the trained machine-learning estimation network, an estimation error loss based on one or more outputs of the trained machine-learning estimation network and the one or more estimator target outputs; and
    determining an update for at least one of the machine-learning estimation network, the encoder, or the decoder.

14. The method of claim 2, wherein the network architecture for the machine-learning estimation network is different for a different channel effect.

15. The method of claim 1, wherein the machine-learning estimation network comprises a neural network including an artificial neural network (ANN), a DNN, a CNN, a recurrent neural network (RNN), or a residual network (ResNet).

16. The method of claim 1, wherein the network architecture comprises definitions of at least one of network connections and hyper-parameters of the machine-learning estimation network.

17. The method of claim 1, wherein training the machine-learning estimation network comprises:
    performing optimization in the machine-learning estimation network to leverage the estimator input and the estimator target outputs to obtain an optimized set of model parameters as the learned estimation information.

18. The method of claim 17, wherein the optimization comprises stochastic gradient descent (SGD), modified SGD with momentum, Adam, RMSProp, or AdaGrad.

19. The method of claim 17, further comprising:
    minimizing a loss function including a mean-squared error (MSE) loss function, a mean absolute error (MAE) loss function, an f-divergence loss function, a cross-entropy loss function, a log-cosine hyperbolic loss function, or a Huber loss function.

20. The method of claim 17, wherein the optimized set of model parameters comprises at least one of weights, biases, or hyper-parameters that allow the machine-learning estimation network to approximate outputs which closely match the estimator target outputs when given the estimator input.

* * * * *